United States Patent
Miyazawa et al.

(10) Patent No.: US 9,837,678 B2
(45) Date of Patent: Dec. 5, 2017

(54) SEPARATION MEMBRANE FOR REDOX FLOW SECONDARY BATTERY AND REDOX FLOW SECONDARY BATTERY COMPRISING THE SAME

(71) Applicant: Asahi Kasei E-materials Corporation, Tokyo (JP)

(72) Inventors: Hiroshi Miyazawa, Tokyo (JP); Tomoaki Takahashi, Tokyo (JP); Hisashi Takeda, Tokyo (JP)

(73) Assignee: Asahi Kasei E-materials Corporation, Tokyo (JP)

( * ) Notice: Subject to any disclaimer, the term of this patent is extended or adjusted under 35 U.S.C. 154(b) by 141 days.

(21) Appl. No.: 14/442,148

(22) PCT Filed: Nov. 12, 2013

(86) PCT No.: PCT/JP2013/080609
§ 371 (c)(1),
(2) Date: May 12, 2015

(87) PCT Pub. No.: WO2014/077257
PCT Pub. Date: May 22, 2014

(65) Prior Publication Data
US 2016/0260988 A1 Sep. 8, 2016

(30) Foreign Application Priority Data
Nov. 13, 2012 (JP) .................... 2012-249748

(51) Int. Cl.
*H01M 8/00* (2016.01)
*H01M 8/18* (2006.01)
(Continued)

(52) U.S. Cl.
CPC ......... *H01M 8/188* (2013.01); *H01M 8/1039* (2013.01); *H01M 8/1058* (2013.01);
(Continued)

(58) Field of Classification Search
CPC ... H01M 8/188; H01M 8/0239; H01M 8/0245
See application file for complete search history.

(56) References Cited

U.S. PATENT DOCUMENTS

| 5,759,711 A | 6/1998 | Miyabayashi et al. |
| 2002/0192560 A1 | 12/2002 | Nishimura et al. |

(Continued)

FOREIGN PATENT DOCUMENTS

| JP | S59-214173 A | 12/1984 |
| JP | H04-312764 A | 11/1992 |

(Continued)

OTHER PUBLICATIONS

Prifti et al., "Membranes for Redox Flow Battery Applications", Membranes, vol. 2, No. 4, pp. 275-306, Jun. 19, 2012.

(Continued)

*Primary Examiner* — Matthew Merkling
(74) *Attorney, Agent, or Firm* — Morgan, Lewis & Bockius LLP

(57) ABSTRACT

The redox flow secondary battery includes an electrolytic cell including a positive electrode cell, a negative electrode cell, and a separation membrane that separates the positive electrode cell and the negative electrode cell. Moreover, the above described redox flow secondary battery is configured as follows. That is, the separation membrane has a microporous membrane and an ion-exchange resin layer contacting the microporous membrane, and the air resistance of the separation membrane per thickness of 200 µm is 10000 sec/100 cc or more. Furthermore, the microporous membrane includes a polyolefin resin or a vinylidene fluoride resin and an inorganic filler. Further, the smoothness of at least a surface of the microporous membrane contacting the ion-exchange resin layer is 16000 seconds or less.

18 Claims, 2 Drawing Sheets

(51) Int. Cl.
*H01M 8/1039* (2016.01)
*H01M 8/1058* (2016.01)

(52) U.S. Cl.
CPC .......... *H01M 2250/10* (2013.01); *Y02B 90/14* (2013.01); *Y02E 60/521* (2013.01); *Y02E 60/528* (2013.01)

(56) References Cited

U.S. PATENT DOCUMENTS

2011/0020692 A1 1/2011 Ikemoto et al.
2013/0252137 A1 9/2013 Zhang et al.

FOREIGN PATENT DOCUMENTS

| JP | H06-260183 A | 9/1994 |
| JP | H09-223513 A | 8/1997 |
| JP | H10-172600 A | 6/1998 |
| JP | 2005-158383 A | 6/2005 |
| WO | 01/91207 A | 11/2001 |
| WO | 2009/099088 A | 8/2009 |
| WO | 2012/075810 A1 | 6/2012 |

OTHER PUBLICATIONS

Supplementary European Search Report dated Dec. 9, 2015, for corresponding European application No. 13855385.4.
International Search Report issued in corresponding International Patent Application No. PCT/JP2013/080609 dated Jan. 21, 2014.

[FIG. 1]
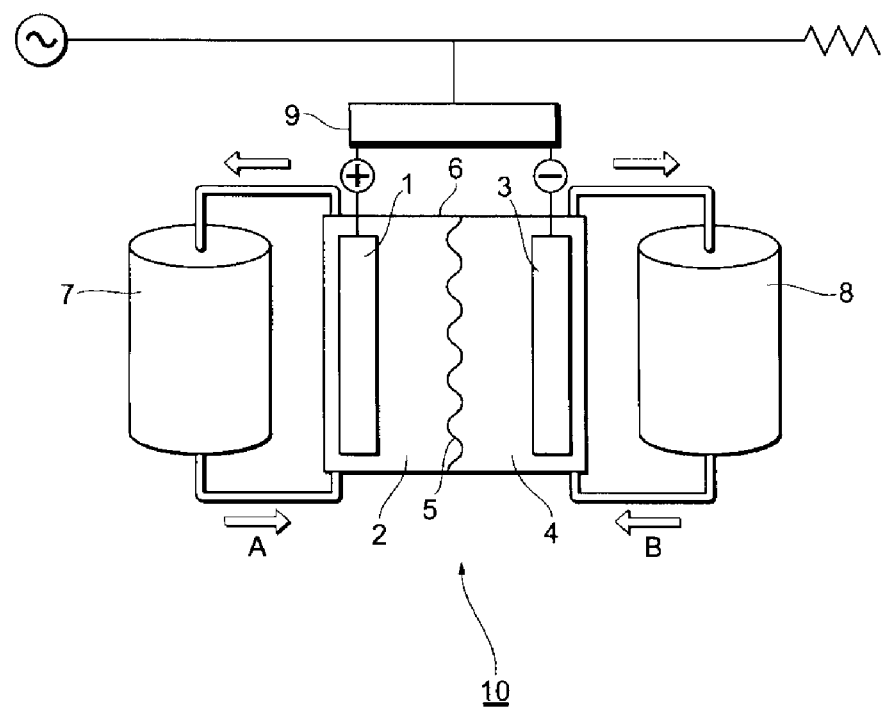

[FIG. 2]
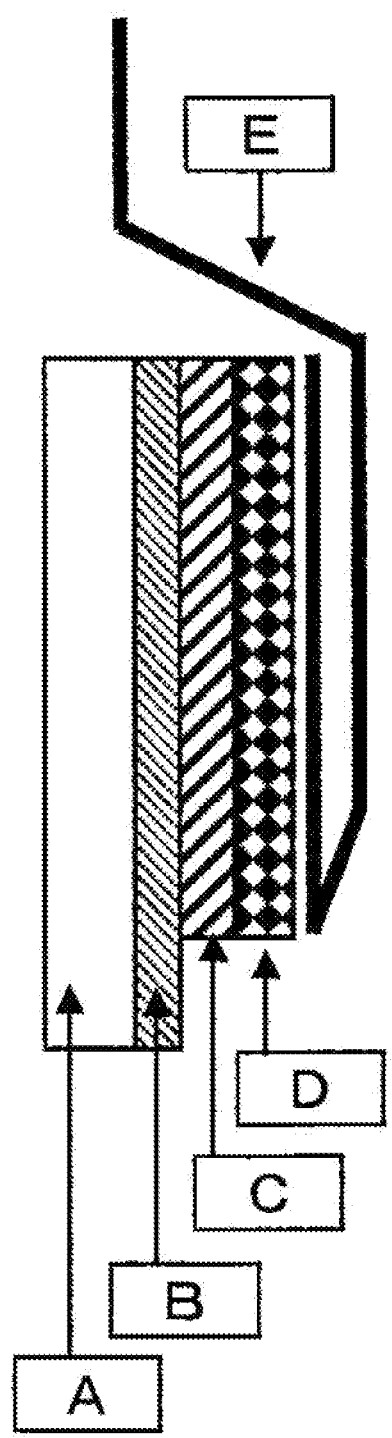

SEPARATION MEMBRANE FOR REDOX FLOW SECONDARY BATTERY AND REDOX FLOW SECONDARY BATTERY COMPRISING THE SAME

TECHNICAL FIELD

The present invention relates to a separation membrane for redox flow secondary battery and a redox flow secondary battery comprising the same.

BACKGROUND ART

The redox flow secondary battery stores and discharges electricity, and it belongs to a large-size stationary battery used for the equalization of electricity usage. In the redox flow secondary battery, an electrolytic solution comprising a positive electrode and a positive electrode active material (positive electrode cell) is separated from a negative electrolytic solution comprising a negative electrode and a negative electrode active material (negative electrode cell) by a separation membrane, and an oxidation-reduction reaction of the two active materials is utilized for the charge and discharge of electricity, and an electrolytic solution comprising each of the two active materials is supplied from a storage tank to an electrolytic cell, and then, electric current is obtained and used.

Examples of the active material contained in the electrolytic solution include iron-chromium-based materials, chromium-bromine-based materials, zinc-bromine-based materials, and vanadium-based materials that utilize a difference in electric charge.

In particular, since a vanadium battery has high electromotive force and it is advantageous in terms of a quick electrode reaction of vanadium ions, a small amount of hydrogen generated as a side effect, and high output power, the development of such a vanadium battery has vigorously proceeded.

In addition, the separation membrane is configured, such that an electrolytic solution comprising active materials for both electrodes is not mixed into the separation membrane.

For example, Patent Literature 1 discloses an example of a zinc-bromine-based redox flow battery having a separation membrane formed with a polyethylene porous membrane and a cation-exchange membrane, which is used to improve current efficiency.

Moreover, Patent Literature 2 discloses a separator for zinc-bromine-based battery having a substrate formed with macromolecules containing hydrophilic fine particles and an ion-exchange resin locally supported by a pore part of the substrate in a highly dispersed state, which are used to suppress the diffusion of ionized bromine molecules into a negative electrode side.

CITATION LIST

Patent Literature

Patent Literature 1: Japanese Patent Laid-Open No. 59-214173
Patent Literature 2: Japanese Patent Laid-Open No. 4-312764

SUMMARY OF INVENTION

Technical Problem

However, the separation membrane disclosed in Patent Literature 1 or Patent Literature 2 still needs to be improved, in terms of an increase in electrical resistance after completion of a cycle test and a decrease in current efficiency after the test.

Under the aforementioned circumstances, it is an object of the present invention to provide a separation membrane for redox flow secondary battery that has sufficient mechanical properties and is able to maintain low electrical resistance and high current efficiency even after completion of a cycle test, and a redox flow secondary battery comprising the same.

Solution to Problem

As a result of intensive studies directed towards achieving the aforementioned object, the present inventors have found that a separation membrane for redox flow secondary battery in which an increase in electrical resistance and a decrease in current efficiency are suppressed after completion of a cycle test, and a redox flow secondary battery comprising the same, can be achieved by allowing the separation membrane to include a microporous membrane having a specific structure and also to have an ion-exchange resin layer, thereby completing the present invention.

That is, the present invention is as follows:

[1]
A redox flow secondary battery comprising an electrolytic cell, the electrolytic cell comprising:
  a positive electrode cell,
  a negative electrode cell, and
  a separation membrane that separates the positive electrode cell and the negative electrode cell,
  wherein the separation membrane comprises a microporous membrane and an ion-exchange resin layer contacting the microporous membrane, and an air resistance of the separation membrane per thickness of 200 μm is 10000 sec/100 cc or more,
  the microporous membrane comprises a polyolefin resin or a vinylidene fluoride resin and an inorganic filler, and
  a smoothness of at least a surface of the microporous membrane contacting the ion-exchange resin layer is 16000 seconds or less.

[2]
The redox flow secondary battery according to [1], wherein a tensile modulus of the microporous membrane is 200 N/cm or less.

[3]
The redox flow secondary battery according to [1] or [2], wherein the redox flow secondary battery is a vanadium redox flow secondary battery, in which an electrolytic solution comprising vanadium is used as a positive electrolytic solution and a negative electrolytic solution.

[4]
The redox flow secondary battery according to any of [1] to [3], wherein the ion-exchange resin layer comprises an ion-exchange resin composition comprising, as a main component, a fluorine-based polyelectrolyte polymer having a structure represented by the following formula (1):

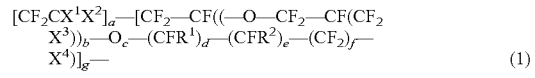
(1)

wherein $X^1$, $X^2$ and $X^3$ each independently represent one or more selected from the group consisting of a halogen atom and a perfluoroalkyl group having 1 to 3 carbon atoms; $X^4$ represents COOZ, $SO_3Z$, $PO_3Z_2$ or $PO_3HZ$, wherein Z represents a hydrogen atom, an alkaline metal atom, an alkaline-earth metal atom, or an amine ($NH_4$, $NH_3R_1$, $NH_2R_1R_2$, $NHR_1R_2R_3$, or $NR_1$, $R_2$, $R_3R_4$), wherein $R_1$, $R_2$, $R_3$ and $R_4$ each independently represent any one or more selected from the group consisting of an alkyl group and an arene group, and when $X^4$ is $PO_3Z_2$, Z may be identical to or different from one another, and $R^1$ and $R^2$ each independently represent one or more selected from the group consisting of a halogen atom, a perfluoroalkyl group and a fluorochloroalkyl group having 1 to 10 carbon atoms; a and g each represent a number satisfying $0 \le a < 1$, $0 < g \le 1$, and $a+g=1$; b represents an integer of 0 to 8; c represents 0 or 1; and d, e and f each independently represent an integer of 0 to 6 (provided that d, e and f do not simultaneously represent 0).

[5]

The redox flow secondary battery according to any of [1] to [4], wherein the ion-exchange resin layer comprises, as a fluorine-based polyelectrolyte polymer, a perfluorocarbon sulfonic acid resin (PFSA resin) having a structure represented by the following formula (2):

$$-[CF_2CF_2]_a-[CF_2-CF((-O-(CF_2)_m-X^4)]_g- \quad (2)$$

wherein a and g each represent a number satisfying $0 \le a < 1$, $0 < g \le 1$, and $a+g=1$; m represents an integer of 1 to 6; and $X^4$ represents $SO_3H$.

[6]

The redox flow secondary battery according to any of [1] to [3], wherein the ion-exchange resin layer comprises a fluorine-based polyelectrolyte polymer having an equivalent weight EW (dry mass grams per equivalent of ion exchange groups) of 300 to 1300 g/eq, and an equilibrium water content of the ion-exchange resin layer is 5% to 80% by mass.

[7]

A separation membrane for redox flow secondary battery, comprising:

a microporous membrane comprising a polyolefin resin or a vinylidene fluoride resin and an inorganic filler; and an ion-exchange resin layer contacting the microporous membrane, wherein an air resistance of the separation membrane per thickness of 200 μm is 10000 sec/100 cc or more, and a smoothness of at least a surface of the microporous membrane contacting the ion-exchange resin layer is 16000 seconds or less.

[8]

The separation membrane for redox flow secondary battery according to [7], wherein a tensile modulus of the microporous membrane is 200 N/cm or less.

[9]

The separation membrane for redox flow secondary battery according to [7] or [8], wherein the ion-exchange resin layer comprises an ion-exchange resin composition comprising, as a main component, a fluorine-based polyelectrolyte polymer having a structure represented by the following formula (1):

$$-[CF_2CX^1X^2]_a-[CF_2-CF((-O-CF_2CF(CF_2X^3))_b-O_c-(CFR^1)_d-(CFR_2)_e-(CF_2)_f-X^4)]_g- \quad (1)$$

wherein $X^1$, $X^2$ and $X^3$ each independently represent one or more selected from the group consisting of a halogen atom and a perfluoroalkyl group having 1 to 3 carbon atoms; $X^4$ represents COOZ, $SO_3Z$, $PO_3Z_2$ or $PO_3HZ$, wherein Z represents a hydrogen atom, an alkaline metal atom, an alkaline-earth metal atom, or an amine ($NH_4$, $NH_3R_1$, $NH_2R_1R_2$, $NHR_1R_2R_3$, or $NR_1R_2R_3R_4$), wherein $R_1$, $R_2$, $R_3$ and $R_4$ each independently represent any one or more selected from the group consisting of an alkyl group and an arene group, and when $X^4$ is $PO_3Z_2$, Z may be identical to or different from one another, and $R^1$ and $R^2$ each independently represent one or more selected from the group consisting of a halogen atom, a perfluoroalkyl group and a fluorochloroalkyl group having 1 to 10 carbon atoms; a and g each represent a number satisfying $0 \le a < 1$, $0 < g \le 1$, and $a+g=1$; b represents an integer of 0 to 8; c represents 0 or 1; and d, e and f each independently represent an integer of 0 to 6 (provided that d, e and f do not simultaneously represent 0).

[10]

The separation membrane for redox flow secondary battery according to any of [7] to [9], wherein the ion-exchange resin layer comprises, as a fluorine-based polyelectrolyte polymer, a perfluorocarbon sulfonic acid resin (PFSA resin) having a structure represented by the following formula (2):

$$-[CF_2CF_2]_a-[CF_2-CF((-O-(CF_2)_m-X^4)]_g- \quad (2)$$

wherein a and g each represent a number satisfying $0 \le a < 1$, $0 < g \le 1$, and $a+g=1$; m represents an integer of 1 to 6; and $X^4$ represents $SO_3H$.

[11]

The separation membrane for redox flow secondary battery according to any of [7] to [10], wherein the ion-exchange resin layer comprises a fluorine-based polyelectrolyte polymer having an equivalent weight EW (dry mass grams per equivalent of ion exchange groups) is 300 to 1300 g/eq, and an equilibrium water content of the ion-exchange resin layer is 5% to 80% by mass.

Advantageous Effects of Invention

The separation membrane for redox flow secondary battery of the present invention has sufficient mechanical properties and is able to maintain low electrical resistance and high current efficiency over a long period of time.

BRIEF DESCRIPTION OF DRAWINGS

FIG. 1 shows an example of the outline view of the redox flow secondary battery according to the present embodiment.

FIG. 2 shows a schematic view (cross-section) of a test piece used in the measurement of peel strength.

DESCRIPTION OF EMBODIMENTS

Hereinafter, the embodiments for carrying out the present invention (hereinafter also referred to as "the present embodiment") will be described in detail. It is to be noted that the present invention is not limited to the present embodiments as described below.

The redox flow secondary battery according to the present embodiment comprises an electrolytic cell comprising a positive electrode cell, a negative electrode cell, and a separation membrane that separates the positive electrode cell and the negative electrode cell. In addition, in the redox flow secondary battery according to the present embodiment, the separation membrane comprises a microporous membrane and an ion-exchange resin layer contacting the microporous membrane, and the air resistance of the separation membrane per thickness of 200 μm is 10000 sec/100 cc or more. Moreover, in the redox flow secondary battery according to the present embodiment, the microporous membrane comprises a polyolefin resin or a vinylidene fluoride resin and an inorganic filler. Furthermore, in the redox flow secondary battery according to the present embodiment, the smoothness of at least a surface of the microporous membrane contacting the ion-exchange resin layer is 16000 seconds or less. Since the redox flow secondary battery according to the present embodiment is configured as described above, it has sufficient mechanical properties and is also able to maintain low electrical resistance and high current efficiency over a long period of time. Such effects are also referred to as simply "the desired effects of the present embodiment" below.

FIG. 1 shows an example of the outline view of the redox flow secondary battery according to the present embodiment. A redox flow secondary battery 10 according to the present embodiment has an electrolytic cell 6 including a positive electrode cell 2 containing a positive electrode 1 formed of a carbon electrode, a negative electrode cell 4 containing a negative electrode 3 formed of a carbon electrode, and a separation membrane 5 that separates the positive electrode cell 2 and the negative electrode cell 4. The positive electrode cell 2 includes a positive electrode electrolytic solution containing an active material, and the negative electrode cell 4 includes a negative electrode electrolytic solution containing an active material. The positive electrode electrolytic solution and the negative electrode electrolytic solution each containing an active material are stored, for example, in a positive electrode electrolytic solution tank 7 and a negative electrode electrolytic solution tank 8, and the solutions are supplied to each cell by a pump or the like. In addition, regarding electric current generated by the redox flow secondary battery, generated direct current may be converted into an alternate current by an AC-DC converter 9.

The redox flow secondary battery according to the present embodiment has a structure, in which liquid-permeable, porous collector electrodes (for a negative electrode and a positive electrode) are disposed on both sides of the separation membrane and these collector electrodes are then pressed by pressing force, and in which one that is partitioned with the separation membrane is defined as a positive electrode cell and the other that is partitioned therewith is defined as a negative electrode cell, and the thickness of each cell is ensured by a spacer.

From the viewpoint of ensuring higher electromotive force, the redox flow secondary battery according to the present embodiment is preferably a vanadium redox flow secondary battery in which vanadium-containing electrolytic solutions are used as a positive electrode electrolytic solution and a negative electrode electrolytic solution. In the case of such a vanadium redox flow secondary battery, a positive electrode electrolytic solution composed of a sulfuric acid electrolytic solution containing tetravalent vanadium ($V^{4+}$) and pentavalent vanadium ($V^{5+}$) is supplied to a positive electrode cell, and a negative electrode electrolytic solution containing trivalent vanadium ($V^{3+}$) and divalent vanadium ($V^2$) is supplied to a negative electrode cell, so that the charge and discharge of a battery is carried out. At this time, upon the charge of a battery, since vanadium ions release electrons in a positive electrode cell, $V^{4+}$ is oxidized to $V^{5+}$, and in a negative electrode cell, $V^{3+}$ is reduced to $V^{2+}$ by electrons returned through the external pathway. In this oxidation-reduction reaction, in the positive electrode cell, the amount of proton ($H^+$) becomes excessive. On the other hand, in the negative electrode cell, the amount of proton ($H^+$) becomes insufficient. The separation membrane transfers such excessive proton in the positive electrode cell selectively to the negative electrode cell, so that electroneutrality can be maintained. Upon the discharge of a battery, a reaction opposite to the above reaction progresses. The current efficiency (%) at this time is indicated as a rate (%) obtained by dividing discharged electric energy by charged electric energy, and both electric energies depend on the internal resistance of a battery cell, the ion selectivity of the separation membrane, and other current loss. Since a decrease in the internal resistance improves voltage efficiency, and the improvement of ion selectivity and a decrease in other current loss improve current efficiency, these become important indicators for the redox flow secondary battery. The redox flow secondary battery of the present embodiment has current efficiency of preferably 90% or more, more preferably 94% or more, and further preferably 97% or more. It is to be noted that such current efficiency can be measured by the method described in Examples later.

Hereinafter, individual constitutional members that constitute the redox flow secondary battery of the present embodiment will be described in detail.

(Separation Membrane)

The separation membrane for redox flow secondary battery according to the present embodiment comprises a microporous membrane and an ion-exchange resin layer. More specifically, the separation membrane for redox flow secondary battery according to the present embodiment comprises a microporous membrane comprising a polyolefin resin or a vinylidene fluoride resin and an inorganic filler, and an ion-exchange resin layer contacting the above described microporous membrane. Moreover, in the separation membrane for redox flow secondary battery according to the present embodiment, the air resistance of the separation membrane per thickness of 200 μm is 10000 sec/100 cc or more, and the smoothness of at least a surface of the above described microporous membrane contacting the ion-exchange resin layer is 16000 seconds or less. Since the separation membrane for redox flow secondary battery according to the present embodiment is configured as described above, the present separation membrane can impart the desired effects of the present embodiment to the redox flow secondary battery according to the present embodiment. It is to be noted that the expression "as a main component" is used in the present embodiment to mean that the component is included in a resin composition at a percentage of preferably 50% to 100% by mass, more preferably 80% to 100% by mass, and further preferably 90% to 100% by mass, based on the mass of the resin composition.

(Microporous Membrane)

The microporous membrane according to the present embodiment includes a polyolefin resin or a vinylidene fluoride resin. In addition, the microporous membrane according to the present embodiment includes an inorganic filler.

(Polyolefin Resin)

In terms of the mechanical strength, moldability, and costs of the obtained microporous membrane, preferred examples of the polyolefin resin according to the present embodiment include; polyethylene resins classified into homopolymers or copolymers, such as high-density polyethylene, low-density polyethylene, and linear low-density polyethylene; polypropylene resins; and mixtures thereof.

When a polyethylene resin is used as the above described polyolefin resin, from the viewpoint of enhancing the mechanical strength of the obtained microporous membrane, it is preferable to use a polyethylene resin having a density of 0.9 g/cm³ or more, and more preferably 0.93 g/cm³ or more. In addition, from the viewpoint of enhancing moldability, it is preferable to use a polyethylene resin having a density of 0.99 g/cm$^3$ or less, and more preferably 0.98 g/cm$^3$ or less.

Examples of the above described polypropylene resin include, but are not limited to, a propylene homopolymer, an ethylene-propylene random copolymer, and an ethylene-propylene block copolymer. Herein, the content of ethylene in the above described polypropylene resin is preferably set at 1 mol % or less, and a propylene homopolymer is more preferable.

The above described polyolefin resin preferably includes ultrahigh molecular weight polyethylene having a limiting viscosity of 7 dl/g or more. From the viewpoint of enhancing mechanical strength, the ratio of the ultrahigh molecular weight polyethylene in the above described polyolefin resin is preferably 5% by mass or more, more preferably 10% by mass or more, and further preferably 15% by mass or more. On the other hand, from the viewpoint of enhancing moldability, the upper limit of the aforementioned ratio is preferably 90% by mass or less, more preferably 85% by mass or less, and further preferably 80% by mass or less. It is to be noted that polyethylene polymerized by a double-step polymerization method can also be used as the above described ultrahigh molecular weight polyethylene. Moreover, as a method using the above described ultrahigh molecular weight polyethylene, it is general to apply a method of mixing the ultrahigh molecular weight polyethylene into another polyolefin constituting the above described polyolefin resin. The above described limiting viscosity can be obtained by the method described in Examples later.

From the viewpoint of enhancing the mechanical strength of the microporous membrane, the limiting viscosity [η] of the polyolefin resin is preferably 1 dl/g or more, more preferably 2 dl/g or more, further preferably 3 dl/g or more, and particularly preferably 3.5 dl/g or more. In order to enhance the moldability of the microporous membrane, the limiting viscosity [η] of the polyolefin resin is preferably 15 dl/g or less, more preferably 12 dl/g or less, further preferably 11 dl/g or less, particularly preferably 10 dl/g or less, and extremely preferably 9 dl/g or less.

(Vinylidene Fluoride Resin)

The vinylidene fluoride resin according to the present embodiment is preferably a homopolymer of vinylidene fluoride, a copolymer of vinylidene fluoride and another monomer that is copolymerizable with vinylidene fluoride, and a mixture thereof.

Examples of the monomer that is copolymerizable with vinylidene fluoride, which can be used herein, include, but are not limited to, one or two or more selected from ethylene tetrafluoride, propylene hexafluoride, ethylene trifluoride, trifluorochloroethylene, and vinyl fluoride. The vinylidene fluoride resin preferably includes 70 mol % or more of vinylidene fluoride as a constitutional unit, and from the viewpoint of enhancing mechanical strength, a homopolymer of vinylidene fluoride is most preferable.

From the viewpoint of mechanical strength, the weight-average molecular weight (Mw) of the above described vinylidene fluoride resin is preferably 50,000 or more, more preferably 100,000 or more, and further preferably 200,000. From the viewpoint of processability, the weight-average molecular weight (Mw) of the above described vinylidene fluoride resin is preferably 1,500,000 or less, more preferably 1,000,000 or less, and further preferably 800,000 or less. The above Mw can be measured, for example, under conditions of a temperature of 40° C. and a flow rate of 10 mL/min, using GPC (gel permeation chromatography) apparatus "GPC-900" manufactured by JASCO Corporation, using "Shodex KD-806M" as a column and "Shodex KD-G" as a precolumn, which are manufactured by SHOWA DENKO K. K., and also using NMP (N-methyl-2-pyrrolidone) as a solvent.

(Inorganic Filler)

The above described microporous membrane contains an inorganic filler. By allowing the microporous membrane of the present embodiment to contain an inorganic filler, the affinity with the ion-exchange resin layer can be increased. In addition, the after-mentioned smoothness value of the microporous membrane can be decreased.

Herein, as an inorganic filler, a metal oxide is preferable. Examples of the metal oxide include, but are not limited to, oxide ceramics such as alumina, silica (silicon oxide), titania, zirconia, magnesia, ceria, yttria, zinc oxide, and iron oxide; nitride ceramics such as silicon nitride, titanium nitride, and boron nitride; ceramics such as silicon carbide, calcium carbonate, aluminum sulfate, aluminum hydroxide, potassium titanate, talc, kaoline clay, kaolinite, halloysite, pyrophyllite, montmorillonite, sericite, mica, amesite, bentonite, asbestos, zeolite, calcium silicate, magnesium silicate, diatomaceous earth, and silica sand; and glass fiber. These substances may be used singly, or a plurality of such substances may be mixed and used.

From the viewpoint of enhancing affinity with an electrolytic solution for redox flow battery, the inorganic filler of the present embodiment is preferably a hydrophilic inorganic filler. Among others, from the viewpoint of realizing high dispersibility and moldability, it is preferable to use silicon oxide (silica) as a main ingredient of the inorganic filler.

From the viewpoint of decreasing the after-mentioned smoothness value of the microporous membrane, the ratio of the above described inorganic filler in the microporous membrane according to the present embodiment to the mass of the microporous membrane is preferably 10% by mass or more, more preferably 15% by mass or more, further preferably 20% by mass or more, and particularly preferably 25% by mass or more. On the other hand, from the viewpoint of preventing a decrease in mechanical strength, the aforementioned ratio is preferably 90% by mass or less, more preferably 80% by mass or less, further preferably 75% by mass or less, and particularly preferably 70% by mass or less.

The above described microporous membrane may include additives such as an antioxidant, an ultraviolet absorber, a lubricant, an anti-blocking agent, a coloring agent, and a flame retardant, as necessary, in a range that does not impair the purpose of the present embodiment.

(Physical Property Values of Microporous Membrane)

In order to obtain high ion permeability, the porosity of the microporous membrane is preferably 30% or more, more preferably 40% or more, and further preferably 50% or more. In addition, from the viewpoint of preventing a significant decrease in mechanical strength, the porosity is preferably 95% or less, more preferably 90% or less, and further preferably 85% or less. The aforementioned porosity can be obtained by the method described in Examples later.

From the viewpoint of the improvement of voltage efficiency, the air resistance of the above described microporous membrane is preferably 5000 sec/100 cc or less, more preferably 3000 sec/100 cc or less, and further preferably 2000 sec/100 cc or less. From the viewpoint of the improvement of the performance of the separation membrane, the lower limit is not particularly limited, and it may be, for example, 1 sec/100 cc. The aforementioned air resistance can be obtained by the method described in Examples later.

The tensile modulus of the above described microporous membrane is preferably 200 N/cm or less. Further, it is more preferable that the aforementioned tensile modulus be 200 N/cm or less, both in the mechanical direction (hereinafter also referred to as "MD") of the membrane, and in the direction transverse to the MD (hereinafter also referred to as "TD"). The aforementioned tensile modulus can be obtained by the method described in Examples later.

The present inventors have found that the tensile modulus of the microporous membrane that is 200 N/cm or less is preferable for the drastic improvement of the durability of the separation membrane. The reason has not yet been discovered, but it is assumed as follows. That is to say, a decrease in the tensile modulus to a predetermined value or less means that the membrane becomes soft, and it is assumed that this would lead to the improvement of the adhesiveness of the microporous membrane to the ion-exchange resin layer and the improvement of durability because of dimensional stability. The tensile modulus is more preferably 180 N/cm or less, further preferably 150 N/cm or less, and particularly preferably 130 N/cm or less. From the viewpoint of the handlability of a battery upon the assembling thereof, the lower limit of the tensile modulus is preferably 10 N/cm or more, more preferably 20 N/cm or more, further preferably 30 N/cm or more, and particularly preferably 50 N/cm or more. From the viewpoint of providing the aforementioned effects more effectively, a polyolefin resin is preferably used as a main component of a resin that forms the microporous membrane.

Examples of the method for adjusting the tensile modulus to a desired value include, but are not limited to, a method for adjusting the crystallinity or molecular weight of a resin used as a raw material, and a method for adjusting the porosity of the microporous membrane.

From the viewpoint of withstanding the pressure upon the flowing of an electrolytic solution and a differential pressure between the positive electrode electrolytic solution and the negative electrode electrolytic solution, the tensile breaking strength of the microporous membrane is preferably 2.5 MPa or more, more preferably 3 MPa or more, and further preferably 3.5 MPa or more. The upper limit of this tensile breaking strength is not particularly limited, and it may be, for example, 50 MPa. The aforementioned tensile breaking strength can be obtained by the method described in Examples later.

Moreover, from the viewpoint of withstanding the pressure upon the flowing of an electrolytic solution and a differential pressure between the positive electrode electrolytic solution and the negative electrode electrolytic solution, the tensile breaking elongation of the above described microporous membrane is preferably 50% or more, more preferably 100% or more, and further preferably 150% or more. The upper limit of this tensile breaking elongation is not particularly limited, and it may be, for example, 1000%. The aforementioned tensile breaking elongation can be obtained by the method described in Examples later.

The smoothness of at least a surface of the microporous membrane according to the present embodiment contacting the above described ion-exchange resin layer is 16000 seconds or less. The smoothness is an indicator showing the unevenness level of the surface of a film-like composition. The present inventors have found that the durability of the separation membrane can be significantly improved by setting the smoothness of the microporous membrane at 16000 seconds or less.

The reason has not yet been discovered, but it is assumed as follows. That is to say, a decrease in the smoothness to a predetermined value or less means an increase in the unevenness level of the surface of the microporous membrane. As such, it is assumed that the unevenness of the microporous membrane provides the after-mentioned binding effect to the ion-exchange resin layer, and thus that it would lead to the improvement of adhesiveness and the improvement of durability because of dimensional stability. The smoothness is preferably 12000 seconds or less, more preferably 10000 seconds or less, and further preferably 8000 seconds or less. The lower limit of the smoothness is preferably 1 second or more, and more preferably 100 seconds or more.

Examples of the method for adjusting the above described smoothness to a desired value include, but are not limited to, a method of adjusting the mixed amount of an inorganic filler used as a raw material for the microporous membrane, a method of adjusting the molecular weight of a resin used as a raw material for the microporous membrane, and a method of stretching a membrane at least in a single direction in the step of producing the microporous membrane.

From the viewpoint of the improvement of the performance of the separation membrane, the electrical resistance of the above described microporous membrane is preferably 0.2 $\Omega \cdot cm^2$/sheet or less, more preferably 0.1 $\Omega \cdot cm^2$/sheet or less, further preferably 0.06 $\Omega \cdot cm^2$/sheet or less, and particularly preferably 0.02 $\Omega \cdot cm^2$/sheet or less. The lower limit of this electrical resistance is not particularly limited, and it may be, for example, 0 $\Omega \cdot 100$ cm$^2$/sheet. The aforementioned electrical resistance can be obtained by the method described in Examples later. Examples of the method for adjusting this parameter include, but are not limited to, a method of adjusting the ratio of a resin to an inorganic filler. In addition, when the microporous membrane is produced by the after-mentioned production method, a method of adjusting the ratio among a resin, an inorganic filler and a plasticizer can be applied as a method for adjusting the aforementioned parameter.

From the viewpoint of mechanical strength, the thickness of the microporous membrane according to the present embodiment is preferably 50 μm or more, more preferably 80 μm or more, further preferably 100 μm or more, and particularly preferably 150 μm or more. From the viewpoint of ion permeability, the aforementioned thickness is preferably 600 μm or less, more preferably 400 μm or less, further preferably 300 μm or less, and particularly preferably 250 μm or less. The aforementioned thickness (membrane thickness) can be obtained by the method described in Examples later.

(Method of Producing Microporous Membrane)

The microporous membrane of the present embodiment can be produced, for example, by the following steps.

[Raw Material Mixture]

A raw material mixture of a resin, a plasticizer, and as necessary, the above described inorganic filler is produced. The resin used as a raw material may be a single type of resin, or a composition composed of two or more types of resins.

As the aforementioned resin, a polyolefin resin or a vinylidene fluoride resin can be used singly, or a mixture of a polyolefin resin and a vinylidene fluoride resin can also be used.

Herein, from the viewpoint of ensuring high mechanical strength, the ratio of the above described resin in the raw material mixture to the total mass of the raw material mixture is preferably 5% by mass or more, more preferably 10% by mass or more, further preferably 15% by mass or more, and particularly preferably 20% by mass or more. On the other hand, from the viewpoint of ensuring high ion permeability, the aforementioned ratio is preferably 60% by mass or less, more preferably 50% by mass or less, further preferably 40% by mass or less, and particularly preferably 30% by mass or less.

From the viewpoint of obtaining good adhesiveness to the ion-exchange resin membrane, the ratio of the inorganic filler in the raw material mixture to the total mass of the raw material mixture is preferably 5% by mass or more, more preferably 10% by mass or more, further preferably 15% by mass or more, and particularly preferably 20% by mass or more. On the other hand, from the viewpoint of achieving high moldability and mechanical strength, the aforementioned ratio is preferably 60% by mass or less, more preferably 50% by mass or less, further preferably 40% by mass or less, and particularly preferably 30% by mass or less.

Preferably, the above described plasticizer is a liquid and is inactive upon melt molding. Examples of such a plasticizer include, but are not limited to, phthalate esters such as diethyl phthalate (DEP), dibutyl phthalate (DBP), Di-n-ocytyl phthalate (DnOP) and bis(2-ethylhexyl) phthalate (DOP), phosphate esters, and organic matters such as liquid paraffin. Among these compounds, DBP, DnOP, DOP, and a mixture thereof are preferable, in order to achieve high ion permeability.

Moreover, from the viewpoint of ensuring high ion permeability, the ratio of the above described plasticizer in the raw material mixture to the total mass of the raw material mixture is preferably 30% by mass or more, more preferably 35% by mass or more, further preferably 40% by mass or more, and particularly preferably 45% by mass or more. On the other hand, from the viewpoint of achieving high moldability and mechanical strength, the aforementioned ratio is preferably 80% by mass or less, more preferably 75% by mass or less, further preferably 70% by mass or less, particularly preferably 65% by mass or less, and extremely preferably 60% by mass or less.

For the mixing of these resin, inorganic filler and plasticizer, it is sufficient to apply a common mixing method using a mixing machine such as a Henschel mixer, a V-blender, a procure mixer, or a ribbon blender.

[Membrane Formation Step]

The raw material mixture obtained in the aforementioned step is kneaded using a melting-kneading machine such as an extruder or a kneader, and the resulting mixture is then subjected to melt molding using a T-die, so as to mold it to a sheet-shaped molded product.

Subsequently, the plasticizer is extracted with a solvent from the sheet-shaped molded product, and is then dried to obtain a microporous membrane that is to be used as a substrate membrane.

Examples of the solvent used for the extraction of the plasticizer include, but are not limited to, organic solvents such as methanol, ethanol, methyl ethyl ketone and acetone, and halogenated hydrocarbon solvents such as methylene chloride.

It is to be noted that the sheet-shaped molded product can be stretched before, after, or before and after the extraction of the plasticizer, in a range that does not impair the advantages of the present embodiment. The permeability and porosity of the sheet-shaped molded product can be adjusted, as appropriate, by stretching the sheet-shaped molded product, which can contribute to the improvement of the performance of a separation membrane.

Moreover, the above described substrate membrane (microporous membrane) may be further subjected to a post-treatment. Examples of the post-treatment include, but are not limited to, a hydrophilic treatment using a surfactant and the like and a crosslinking treatment using ionizing radiation.

(Ion-Exchange Resin Layer)

The ion-exchange resin layer according to the present embodiment is allowed to come into contact with the microporous membrane according to the present embodiment. It is to be noted that the aforementioned expression "contact" includes not only an aspect in which the ion-exchange resin layer directly contacts the microporous membrane, but also an aspect in which the ion-exchange resin layer indirectly contacts the microporous membrane, for example, via an intervening layer such as an adhesive layer. The ion-exchange resin layer according to the present embodiment is not particularly limited, and it is preferably formed from an ion-exchange resin composition.

The aforementioned ion-exchange resin composition is not particularly limited, and examples of the ion-exchange resin composition include a cation-exchange resin and an anion-exchange resin. Examples of the cation-exchange resin that can be used herein include, but are not limited to, fluorine-based cation-exchange resins having ion-exchangeable acidic groups such as COOH or $SO_3H$. Examples of the anion-exchange resin that can be used herein include, but are not limited to, known materials such as polysulfone-type hydrocarbon-based anion-exchange resins, styrene-based anion-exchange resins having pyridinium groups, and cross-linked anion-exchange resins formed by copolymerization of the aforementioned styrene-based anion-exchange resins with divinyl benzene.

The ion-exchange resin layer according to the present embodiment preferably includes, as a main component, a polyelectrolyte polymer having a structure represented by the following formula (1). When a fluorine-based cation-exchange resin including, as a main component, the aforementioned polyelectrolyte polymer is used, the desired effects of the present embodiment tend to become more significant.

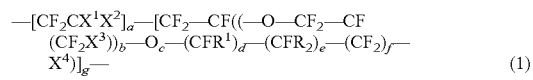

$$—[CF_2CX^1X^2]_a—[CF_2—CF((—O—CF_2—CF(CF_2X^3))_b—O_c—(CFR^1)_d—(CFR_2)_e—(CF_2)_f—X^4)]_g— \quad (1)$$

In the formula (1), $X^1$, $X^2$ and $X^3$ each independently represent one or more selected from the group consisting of a halogen atom and a perfluoroalkyl group having 1 to 3 carbon atoms; $X^4$ represents COOZ, $SO_3Z$, $PO_3Z_2$ or $PO_3HZ$, wherein Z represents a hydrogen atom, an alkaline metal atom, an alkaline-earth metal atom, or an amine ($NH_4$, $NH_3R_1$, $NH_2R_1R_2$, $NHR_1R_2R_3$, or $NR_1R_2R_3R_4$), wherein $R_1$, $R_2$, $R_3$ and $R_4$ each independently represent any one or more selected from the group consisting of an alkyl group and an aryl group, and when $X^4$ is $PO_3Z_2$, Z may be identical to or different from one another, and $R^1$ and $R^2$ each independently represent one or more selected from the group consisting of a halogen atom, a perfluoroalkyl group and a fluorochloroalkyl group having 1 to 10 carbon atoms; a and g each represent a number satisfying $0 \leq a < 1$, $0 < g \leq 1$, and $a+g=1$; b represents an integer of 0 to 8; c represents 0 or 1; and d, e and f each independently represent an integer of 0 to 6 (provided that d, e and f do not simultaneously represent 0).

$X^1$, $X^2$ and $X^3$ each independently represent one or more selected from the group consisting of a halogen atom and a perfluoroalkyl group having 1 to 3 carbon atoms. Herein, examples of the halogen atom include a fluorine atom, a chlorine atom, a bromine atom, and an iodine atom. From the viewpoint of the chemical stability of a polymer, $X^1$, $X^2$ and $X^3$ are preferably a fluorine atom or a perfluoroalkyl group having 1 to 3 carbon atoms.

$X^4$ represents COOZ, $SO_3Z$, $PO_3Z_2$ or $PO_3HZ$. In the present description, $X^4$ is also referred to as an "ion-exchange group." Z represents a hydrogen atom, an alkaline metal atom, an alkaline-earth metal atom, or an amine ($NH_4$, $NH_3R_1$, $NH_2R_1R_2$, $NHR_1R_2R_3$, or $NR_1R_2R_3R_4$). Herein, the alkaline metal atom is not particularly limited, and examples of the alkaline metal atom include a lithium atom, a sodium atom, and a potassium atom. In addition, the alkaline-earth metal atom is not particularly limited, and examples of the alkaline-earth metal atom include a calcium atom and a magnesium atom. Moreover, $R_1$, $R_2$, $R_3$ and $R_4$ each independently represent any one or more selected from the group consisting of an alkyl group and an aryl group. When $X^4$ is $PO_3Z_2$, Z may be identical to or different from one another. From the viewpoint of the chemical stability of the polymer, $X^4$ is preferably $SO_3Z$.

$R^1$ and $R^2$ each independently represent one or more selected from the group consisting of a halogen atom, and a perfluoroalkyl group and a fluorochloroalkyl group having 1 to 10 carbon atoms. Herein, examples of the halogen atom include a fluorine atom, a chlorine atom, a bromine atom, and an iodine atom.

a and g each represent a number satisfying $0 \leq a < 1$, $0 < g \leq 1$, and $a+g=1$. b represents an integer of 0 to 8. c represents 0 or 1. d, e and f each independently represent an integer of 0 to 6. However, d, e and f do not simultaneously represent 0.

The ion-exchange resin layer according to the present embodiment preferably includes a perfluorocarbon sulfonic acid resin (hereinafter also abbreviated as a "PFSA resin") as a fluorine-based polyelectrolyte polymer because the desired effects of the present embodiment tend to become more significant with the use of the PFSA resin. The PFSA resin according to the present embodiment is a resin in which perfluorocarbons as side chains are bonded to the main chain composed of a tetrafluoroethylene skeleton chain, and one or two or more sulfonic acid groups are bonded to the each side chain. Some of the aforementioned sulfonic acid groups may be in the form of salts in some cases.

The PFSA resin according to the present embodiment preferably includes a repeating unit represented by —($CF_2$—$CF_2$)—, and a repeating unit represented by the following formula (3), or the following formula (4) or the following formula (4'):

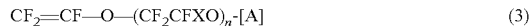  (3)

wherein X represents F or a perfluoroalkyl group having 1 to 3 carbon atoms, n represents an integer of 0 to 5, and [A] represents ($CF_2$)$_m$—W (wherein m represents an integer of 0 to 6, provided that n and m do not simultaneously represent 0, and W represents $SO_3H$; or

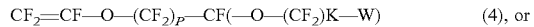  (4), or

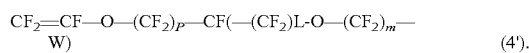  (4').

In the above formulae (4) and (4'), P represents an integer of 0 to 5, k represents an integer of 1 to 5, L represents an integer of 1 to 5, and m represents an integer of 0 to 6. However, k and L may be identical to or different from each other, and P, K and L do not simultaneously represent 0.

The PFSA resin is more preferably a copolymer comprising a repeating unit represented by —($CF_2$—$CF_2$)— and a repeating unit represented by —($CF_2$—CF(—O—($CF_2$CFXO)$_n$—($CF_2$)$_m$—$SO_3H$))—. In the above formula, X represents F or $CF_3$, n represents an integer of 0 to 5, and m represents an integer of 0 to 12. However, n and m do not simultaneously represent 0. When the PFSA resin is a copolymer having the aforementioned structure and also having an equivalent weight EW of 300 to 1500, the obtained ion-exchange resin layer has sufficient hydrophilicity and tends to have strong resistance to radical species generated as a result of oxidative degradation.

Further, when the PFSA resin comprises the repeating unit represented by the above described —($CF_2$—CF(—O—($CF_2$CFXO)$_n$—($CF_2$)$_m$—$SO_2H$))—, wherein n is 0 and m is an integer of 1 to 6, or when the PFSA resin comprises both repeating units represented by $CF_2$=CF—O—($CF_2$)$_P$—CF(—O—($CF_2$)$_K$—W) of formula (4) and $CF_2$=CF—O—($CF_2$)$_P$—CF(—($CF_2$)$_L$—O—($CF_2$)$_m$—W), the equivalent weight EW tends to become low, and the hydrophilicity of the obtained ion-exchange resin layer tends to become high.

The ion-exchange resin layer according to the present embodiment is preferably a perfluorocarbon sulfonic acid resin (PFSA) having, as a fluorine-based polyelectrolyte polymer, a structure represented by the following formula (2), because the desired effects of the present embodiment tend to become more significant with the use of the perfluorocarbon sulfonic acid resin (PFSA):

  (2)

wherein a and g each represent a number satisfying $0 \leq a < 1$, $0 < g \leq 1$, and $a+g=1$, m represents an integer of 1 to 6, and $X^4$ represents $SO_3H$.

The fluorine-based polyelectrolyte polymer according to the present embodiment can be obtained, for example, by producing a polyelectrolyte polymer precursor (hereinafter also referred to as a "resin precursor") and then hydrolyzing the precursor.

In the case of using the PFSA resin, the fluorine-based polyelectrolyte polymer is obtained, for example, by hydrolyzing a PFSA resin precursor composed of a copolymer of a vinyl fluoride ether compound represented by the following formula (5) and an olefin fluoride monomer represented by the following general formula (6):

  (5)

wherein X represents F or a perfluoroalkyl group having 1 to 3 carbon atoms, n represents an integer of 0 to 5, A represents ($CF_2$)$_m$—W, or $CF_2$=CF—O—($CF_2$)$_P$—CF(—O—($CF_2$)$_K$—W) or $CF_2$=CF—O—($CF_2$)$_P$—CF(—($CF_2$)$_L$—O—($CF_2$)$_m$—W), p represents an integer of 0 to 12, m represents an integer of 0 to 6 (provided that n and m do not simultaneously represent 0), k represents an integer of 1 to 5, L represents an integer of 1 to 5 (provided that n, L and K do not simultaneously represent 0), and W represents a functional group that can be converted to $SO_3H$ by hydrolysis; and

  (6)

wherein Z represents H, Cl, F, a perfluoroalkyl group having 1 to 3 carbon atoms, or a cyclic perfluoroalkyl group optionally containing oxygen.

In the above formula (5), W representing a functional group that can be converted to $SO_3H$ by hydrolysis is not particularly limited, and it is preferably $SO_2F$, $SO_2Cl$, or $SO_2Br$. In addition, in the above formulae, X=$CF_3$, W=$SO_2F$, and Z=F are more preferable. Among others, when n=0, m=an integer of 0 to 6 (provided that n and m do not simultaneously represent 0), X=$CF_3$, W=$SO_2F$, and Z=F, a solution of high hydrophilicity and high concentration of resin tend to be obtained. Thus, the aforementioned conditions are particularly preferable.

The precursor of the fluorine-based polyelectrolyte polymer according to the present embodiment can be synthesized by a known means. Examples of a known method of synthesizing the precursor of the fluorine-based polyelectrolyte polymer include: a polymerization method which includes filling and dissolving a vinyl fluoride compound having an ion-exchange group precursor and gas of olefin fluoride such as tetrafluoroethylene (TFE) in a polymerization solvent such as fluorine-containing hydrocarbon according to a polymerization method utilizing a peroxide of a radical generator, etc., so that they are allowed to react therein (solution polymerization); a polymerization method of using a vinyl fluoride compound itself as a polymerization solvent, without using a solvent such as fluorine-containing hydrocarbon (bulk polymerization); a polymerization method which includes filling a vinyl fluoride compound and gas of olefin fluoride in an aqueous solution of surfactant used as a solvent, so that they are reacted therein (emulsification polymerization); a polymerization method which includes filling a vinyl fluoride compound and gas of olefin fluoride in an aqueous solution of emulsification aids such as a surfactant and alcohol, and emulsifying and reacting them (emulsion polymerization); and a polymerization method which includes filling and suspending a vinyl fluoride compound and gas of olefin fluoride in an aqueous solution of suspension stabilizer, so that they are reacted therein (suspension polymerization).

The precursor of the fluorine-based polyelectrolyte polymer according to the present embodiment produced by any of the above described polymerization methods can be used. Moreover, there may also be used a block-like or tapered polymer, which is obtained by adjusting polymerization conditions such as the amount of TFE gas supplied.

Furthermore, with regard to the fluorine-based polyelectrolyte polymer precursor, impure termini generated in the molecular structure of the resin during such a polymerization reaction, or structurally easily oxidized portions (a CO group, an H-binding portion, etc.) may be treated under fluorine gas according to a known method, so that the portions may be fluorinated.

Further, the molecular weight of the resin precursor can be evaluated, using a value of melt flow index (MFI) measured in accordance with ASTM: D1238. Specifically, the MFI of the resin precursor is preferably 0.05 to 50 (g/10 min) under measurement conditions of a temperature of 270° C. and a load of 2160 g. A more preferred range of the MFI of the precursor resin is 0.1 to 30 (g/10 min), and a further preferred range thereof is 0.5 to 20 (g/10 min).

The fluorine-based polyelectrolyte polymer resin precursor is subjected to extrusion molding with a nozzle, a die or the like, using an extruder, and it is then subjected to a hydrolysis treatment. Otherwise, a product generated as a result of the polymerization, namely, a dispersed liquid-state product, or a powdery product obtained by precipitation and filtration of the dispersed liquid, is subjected to a hydrolysis treatment. The shape of the resin precursor is not particularly limited. From the viewpoint of increasing a processing speed in the after-mentioned hydrolysis treatment and acid treatment, the shape of the resin precursor is preferably a pellet having a size of 0.5 cm$^3$ or less, a dispersed liquid, or a powder particle, and among these, a powder particle after completion of the polymerization is preferably used. From the viewpoint of costs, a film-like resin precursor obtained by extrusion molding may also be used.

The resin precursor, which is obtained as described above and is then molded as necessary, is then immersed in a basic reaction solution, so that it is subjected to a hydrolysis treatment. Preferred examples of the basic reaction solution used in the hydrolysis treatment include, but are not limited to, aqueous solutions of amine compounds such as dimethylamine, diethylamine, monomethylamine or monoethylamine, and aqueous solutions of hydroxides of alkaline metals or alkaline-earth metals. An aqueous solution of sodium hydroxide or potassium hydroxide is particularly preferable. When the hydroxide of alkaline metal or alkaline-earth metal is used, the content thereof is not particularly limited, and it is preferably 10% to 30% by mass based on the mass of the entire reaction solution. More preferably, the aforementioned reaction solution further includes a swellable organic compound such as methyl alcohol, ethyl alcohol, acetone or DMSO. The content of such a swellable organic compound is preferably 1% to 30% by mass based on the mass of the entire reaction solution.

After the resin precursor has been hydrolyzed in the above described basic reaction solution, it is fully washed with hot water or the like, and it is then subjected to an acid treatment. Preferred examples of the acid used in the acid treatment include, but are not limited to, mineral acids such as hydrochloric acid, sulfuric acid and nitric acid, and organic acids such as oxalic acid, acetic acid, formic acid and trifluoroacetic acid. A mixture of such an acid and water is more preferable. In addition, the aforementioned acids may be used singly or in combination of two or more types. Moreover, the basic reaction solution used in the hydrolysis treatment may be removed in advance from the reaction solution by treating the solution with a cation-exchange resin or the like, before the acid treatment.

The resin precursor is protonated by the acid treatment, so that an ion-exchange group is generated. For instance, W in the PFSA resin precursor is protonated by the acid treatment, so that it is converted to $SO_3H$. The fluorine-based polyelectrolyte polymer obtained by the hydrolysis and the acid treatment can be dispersed or dissolved in a protic organic solvent, water, or a mixed solvent of them.

The equivalent weight EW (the dry mass grams of the fluorine-based polyelectrolyte polymer per equivalent of ion exchange groups) of the fluorine-based polyelectrolyte polymer according to the present embodiment is preferably adjusted to 300 to 1300 (g/eq). That is to say, the ion-exchange resin layer according to the present embodiment preferably includes a fluorine-based polyelectrolyte polymer having an equivalent weight EW (dry mass grams per equivalent of ion exchange groups) of 300 to 1300 g/eq. The equivalent weight EW of the fluorine-based polyelectrolyte polymer according to the present embodiment is more preferably 350 to 1000 (g/eq), further preferably 400 to 900 (g/eq), and particularly preferably 450 to 750 (g/eq).

By adjusting the equivalent weight EW of the fluorine-based polyelectrolyte polymer into the aforementioned range, excellent hydrophilicity can be imparted to the ion-exchange resin composition including the fluorine-based polyelectrolyte polymer, and the ion-exchange resin layer including the resin composition tends to exhibit low electrical resistance and high hydrophilicity, high oxidation resistance (hydroxy radical resistance), low electrical resistance, and good ion permselectivity.

From the viewpoint of hydrophilicity and the water resistance of the membrane, the equivalent weight EW of the fluorine-based polyelectrolyte polymer is preferably 300 or more, and from the viewpoint of hydrophilicity and the electrical resistance of the membrane, the aforementioned equivalent weight EW is preferably 1300 or less. Moreover, when the EW of the fluorine-based polyelectrolyte polymer is close to the aforementioned lower limit value, the resin may be modified by directly or indirectly carrying out a partial crosslinking reaction among the molecules of some ion-exchange groups on the side chains of the membrane, so that solubility or excessive swelling may be controlled.

Examples of the aforementioned partial crosslinking reaction include, but are not limited to, a reaction of ion-exchange groups with functional groups of other molecules or the main chain, a reaction between ion-exchange groups, and a crosslinking reaction (covalent bond) mediated by an oxidation-resistant low molecular compound, oligomer, or polymer. It may be a reaction with a substance forming a salt (including an ionic bond with a $SO_3H$ group) in some cases. Examples of the oxidation-resistant low molecular compound, the oligomer or the polymer include, but are not limited to, polyhydric alcohols and organic diamines.

When such a partial crosslinking reaction is carried out, the water resistance of the membrane becomes favorable, even if the EW of the fluorine-based polyelectrolyte polymer is approximately 280. That is, even if the amount of ion-exchange groups that is evaluated with EW is not sacrificed so much, it may be adequate if water solubility decreases (water resistance improves). In addition, when the fluorine-based polyelectrolyte polymer is in a low melt flow domain (polymer domain) and many intermolecular linkages take place, it may be adequate if water solubility decreases, without sacrificing the amount of ion-exchange groups so much, as in the case of carrying out a partial crosslinking reaction.

Moreover, some functional groups (e.g., $SO_2F$ groups) of the fluorine-based polyelectrolyte polymer before hydrolysis may be partially (including intermolecular reactions) imidated (alkylimidation, etc.).

The equivalent weight EW of the fluorine-based polyelectrolyte polymer can be measured by subjecting the fluorine-based polyelectrolyte polymer to salt replacement, and then subjecting the obtained solution to back titration using an alkaline solution.

In addition, the equivalent weight EW of the fluorine-based polyelectrolyte polymer can be adjusted using the copolymerization ratio of a fluorine-based monomer, selection of the type of a monomer, etc.

The content of the fluorine-based polyelectrolyte polymer in the ion-exchange resin composition forming the ion-exchange resin layer according to the present embodiment is preferably 33.3% to 100% by mass, more preferably 40% to 100% by mass, and further preferably 50% to 99.5% by mass.

Furthermore, in the fluorine-based polyelectrolyte polymer, a partial salt (in an amount of approximately 0.01% to 5% by equivalent based on the equivalent of total ion-exchange groups) with alkaline metal, alkaline-earth metal, or radical-decomposable transition metal (Ce compound, Mn compound, etc.) may be used singly, or it may also be used in combination with a basic polymer.

As the fluorine-based polyelectrolyte polymer according to the present embodiment, fluorine-based resins other than the PFSA resin (resins including carboxylic acid, phosphoric acid or the like, and other known fluorine-based resins) can be used. When two or more types of these resins are used, they may be mixed by dissolving them in a solvent or dispersing them in a medium, or otherwise, resin precursors may be subjected to extrusion mixing.

(Physical Property Values of Ion-Exchange Resin Layer)

In the present embodiment, the equilibrium water content of the ion-exchange resin layer is preferably 5% by mass or more, more preferably 10% by mass or more, and further preferably 15% by mass or more. In addition, the upper limit of the equilibrium water content is preferably 80% by mass or less, more preferably 50% by mass or less, and further preferably 40% by mass or less. That is to say, in the present embodiment, the equilibrium water content of the ion-exchange resin layer is preferably 5% to 80% by mass. When the equilibrium water content of the ion-exchange resin layer is 5% by mass or more, the electrical resistance, current efficiency, oxidation resistance and ion permselectivity of the membrane tend to become favorable. On the other hand, when the equilibrium water content is 50% by mass or less, the dimensional stability and strength of the membrane become favorable, and an increase in water-soluble components tends to be suppressed. The equilibrium water content of the ion-exchange resin layer is evaluated based on a membrane formed from a dispersed liquid of a resin composition in water and an alcohol solvent, which is then dried at 160° C. or less, and it corresponds to a coefficient of saturated water absorption (Wc) after completion of the equilibrium of the membrane (which is left for 24 hours) at 23° C. at a relative humidity (RH) of 50%.

The equilibrium water content of the ion-exchange resin layer can be adjusted by the same method as that for the above described EW.

(Method of Forming Ion-Exchange Resin Layer)

Examples of the method for forming the ion-exchange resin layer according to the present embodiment include, but are not limited to, a) a method of laminating a microporous membrane on a membrane formed from an ion-exchange resin composition (hereinafter also referred to as an "ion-exchange resin membrane"), b) a method which includes applying a dispersed liquid of ion-exchange resin to a microporous membrane and then removing a solvent from the dispersed liquid to form an ion-exchange resin layer, and a method of combining the above formation methods a) with b).

(Formation Method a))

In the above described formation method a), the microporous membrane is laminated on the ion-exchange resin membrane. In the separation membrane of the present embodiment, after the microporous membrane has been laminated on the ion-exchange resin membrane, they may be physically or chemically adhered to each other.

(Method for Producing Ion-Exchange Resin Membrane)

The method for producing the ion-exchange resin membrane (membrane formation method) is not particularly limited, and extrusion method and cast membrane formation, which have been known, can be applied. The ion-exchange resin membrane may be a monolayer or a multilayer (2 to 5 layers). In the case of a multilayer, the performance of the ion-exchange resin membrane can be improved by laminating membranes having different properties (for example, resins having different EW or functional groups). In the case of a multilayer, layers may be laminated on one another upon membrane formation by extrusion or upon cast membrane formation, or the obtained membranes may be laminated on one another.

It is preferable that the ion-exchange resin membrane formed by the aforementioned method be fully washed with water, or be treated with an aqueous acidic solution of diluted hydrochloric acid, nitric acid, sulfuric acid or the like, as necessary, before washing with water, so that impurities are removed. In addition, after the removal of impurities, the ion-exchange resin membrane is preferably subjected to a heat treatment in air (preferably, in inert gas) at 130° C. to 200° C., preferably 140° C. to 180° C., and more preferably 150° C. to 170° C., for 1 to 30 minutes. The time required for the heat treatment is more preferably 2 to 20 minutes, further preferably 3 to 15 minutes, and particularly preferably 5 to 10 minutes.

By performing the aforementioned heat treatment, the water resistance of the ion-exchange resin membrane and the coefficient of saturated water absorption tend to become stable. Regarding the aforementioned water resistance, in particular, the ratio of hot water-soluble components tends to be decreased. In addition, from the viewpoint of the improvement of membrane strength as well, the heat treatment is useful. In particular, in the case of applying the cast membrane formation method, the heat treatment is useful. One reason that the heat treatment provides the aforementioned effects would be that a stable cluster, in which a polymer forming the ion-exchange resin membrane hardly swells, is generated as a result of the heat treatment. That is to say, it is considered that particles (primary particles and secondary particles) and molecules derived from raw materials are fully intertwined with one another by performing the aforementioned heat treatment.

In addition, it is assumed that another reason that the heat treatment provides the aforementioned effects would be that fine intermolecular crosslinks are generated among the molecules of the fluorine-based polyelectrolyte polymer as a result of the heat treatment, so that clusters each having a small diameter are stably and uniformly obtained. However, the reasons that the heat treatment provides the aforementioned effects are not limited thereto.

The ion-exchange resin membrane according to the present embodiment may have a reinforced material. The reinforced material is not particularly limited, and examples of the reinforced material include common non-woven fabric and woven fabric and porous membranes composed of various raw materials. The porous membrane is not particularly limited, as long as it has good affinity with the fluorine-based polyelectrolyte polymer. Among others, using a stretched porous polytetrafluoroethylene (PTFE) membrane, a reinforced membrane formed by embedding an ion-exchange resin composition including, as a main component, a fluorine-based polyelectrolyte polymer into the stretched porous PTFE membrane, with substantially no spaces, is more preferable from the viewpoint of the strength of a thin membrane and also from the viewpoint of suppressing a dimensional change in the plane (length/width) direction. The aforementioned reinforced membrane can be obtained by impregnating a porous membrane with an appropriate amount of a dispersed liquid containing an appropriate concentration of a solute having the aforementioned component in an organic solvent or alcohol-water containing the aforementioned ion-exchange resin composition, and then drying it.

The solvent used upon the production of a reinforced membrane is not particularly limited, and it is preferably a solvent having a boiling point of 250° C. or less, more preferably a solvent having a boiling point of 200° C. or less, and further preferably a solvent having a boiling point of 120° C. or less. Among others, water and aliphatic alcohols are preferable, and specific examples of such solvents include water, methanol, ethanol, 1-propanol, 2-propanol, 1-butanol, 2-butanol, isobutyl alcohol, and tert-butyl alcohol. The aforementioned solvents may be used singly, or in combination of two or more types.

The breaking strength of the ion-exchange resin membrane of the present embodiment is preferably 200 kgf/cm$^2$ or more, and more preferably 300 kgf/cm$^2$ or more. When the breaking strength of the ion-exchange resin membrane is 200 kgf/cm$^2$ or more, suppression of a dimensional change tends to become easy. The breaking strength of the ion-exchange resin membrane can be measured according to JIS K7113, using a precise universal tester, AGS-1KNG, manufactured by Shimadzu Corporation. For the measurement, a sample is left in a constant temperature room at 23° C. at 65% RH for 12 hours or more, and it is then cut into a size of 5 mm in width×50 mm in length, and the thus obtained sample is then subjected to the measurement. The measurement is carried out on three samples, and the mean value is obtained and it is defined as the breaking strength of the ion-exchange resin membrane.

(Method for Laminating Microporous Membrane on Ion-Exchange Resin Membrane)

The method for laminating a microporous membrane on an ion-exchange resin membrane is, for example, a method of disposing an ion-exchange resin membrane on the surface of a microporous membrane. At this time point, the microporous membrane does not need to adhere to the ion-exchange resin membrane.

That is to say, upon the assembly of a battery cell, when collector electrodes are disposed on both sides of the laminated membrane and pressing force is then applied thereon, the microporous membrane closely adheres to the ion-exchange resin membrane, and thereby, these membranes act as a single separation membrane.

Moreover, the microporous membrane may physically or chemically adhere to the ion-exchange resin membrane.

Examples of such a method include a method of allowing the microporous membrane to adhere to the ion-exchange resin membrane by pressure bonding.

Examples of such a pressure bonding method include, but are not limited to, a pressure bonding method which includes applying pressure to the microporous membrane and the ion-exchange resin membrane, using a heated pressing machine, and a thermocompression bonding method which includes supplying the microporous membrane and the ion-exchange resin membrane between heated rolls.

The temperature of a pressing machine or a roll used upon the pressure bonding is preferably the melting point or lower of the microporous membrane because it can suppress a decrease in proton permeability caused by the clogging of the pores of the microporous membrane due to the fusion of a resin.

In addition, the pressure of a pressing machine or a roll used upon the pressure bonding (contact pressure) is preferably 15 MPa or less, more preferably 10 MPa or less, and further preferably 5 MPa or less, from the viewpoint of preventing the clogging of the pores of the microporous membrane.

The embodiment of lamination of the microporous membrane on the ion-exchange resin membrane is not particularly limited, and specific examples include an embodiment in which one microporous membrane is laminated on one ion-exchange resin membrane, an embodiment in which ion-exchange resin membranes are present on both sides of one microporous membrane, and an embodiment in which microporous membranes are present on both sides of one ion-exchange resin membrane.

(Formation Method b))

Examples of the dispersed liquid of an ion-exchange resin that can be used in the formation method b) include Nafion (registered trademark) DE2020, DE2021, DE520, DE521, DE1020, and DE1021, which are all manufactured by Du Pont. In addition, Ionomer Solution SS900/10 and SS1100/5, manufactured by Asahi Kasei E-materials Corporation, can also be used.

The solvent used for the dispersed liquid is not particularly limited, and it is preferably a solvent having a boiling point of 250° C. or less, more preferably a solvent having a boiling point of 200° C. or less, and further preferably a solvent having a boiling point of 120° C. or less. Among others, water and aliphatic alcohols are preferable, and specific examples of such solvents include water, methanol, ethanol, 1-propanol, 2-propanol, 1-butanol, 2-butanol, isobutyl alcohol, and tert-butyl alcohol. The aforementioned solvents may be used singly, or in combination of two or more types. Among others, a mixed solvent of ethanol and water is preferable.

When such a mixed solvent of ethanol and water is used, regarding the mixing ratio between the ethanol and the water, the mixed solvent preferably includes 20% by mass or more of ethanol from the viewpoint of reinforcing the ion-exchange resin layer. The mixed solvent includes more preferably 30% by mass or more, and further preferably 40% by mass or more of ethanol.

Examples of the coating method include, but are not limited to, a gravure coater method, a small-diameter gravure coater method, a reverse roll coater method, a transfer roll coater method, a kiss coater method, a dip coater method, a knife coater method, an air doctor coater method, a blade coater method, a rod coater method, a squeeze coater method, a cast coater method, a die coater method, a screen printing method, and a spray coating method. Using these methods, the ion-exchange resin dispersed solution may be coated on only one surface of the microporous membrane used as a base material, or may also be coated on both surfaces thereof.

In addition, prior to the coating, a surface treatment may be performed on the microporous membrane used as a base material. If such a surface treatment is performed, the subsequent impregnation with a polyelectrolyte can be favorably carried out. Examples of such a surface treatment include a corona discharge treatment, an ultraviolet irradiation treatment, and a plasma treatment. Moreover, for the purpose of increasing the impregnation or adhesiveness of the ion-exchange resin composition to the microporous membrane, the surface of the microporous membrane may get wet with the solvent used for the dispersed liquid in advance. Alternatively, the dispersed liquid may be diluted with the aforementioned solvent, and the diluted liquid may be then applied. Otherwise, the base material may be coated with a solution of basic polymer or the like in advance.

In the present embodiment, since the smoothness of the microporous membrane is 16000 seconds or less, the appearance quality of a dispersed liquid of ion-exchange resin applied becomes favorable. In addition, the aforementioned smoothness is characterized in that it improves the peel strength of the ion-exchange resin layer. From the viewpoint of durability, the aforementioned peel strength is preferably more than 10 g, more preferably 30 g or more, further preferably 60 g or more, and particularly preferably 100 g or more. The upper limit of the peel strength is not particularly limited, and it may be, for example, 400 g or less. The aforementioned peel strength can be measured by the method described in the after-mentioned Examples.

With regard to the separation membrane according to the present embodiment, by combining the microporous membrane with the ion-exchange resin layer, the strength of the membrane is improved, and further, a dimensional change in the plane (length/width) direction can be suppressed when the separation membrane is immersed in an electrolytic solution. The dimensional change of the ion-exchange resin layer in the plane direction is preferably 20% or less, and more preferably 15% or less. The dimensional change of the ion-exchange resin layer in the plane direction that is 20% or less is preferable, since stress applied on the separation membrane becomes small and durability tends to be improved, when a battery cell is assembled. The aforementioned dimensional change can be directly measured using, for example, a measure made of stainless steel. More specifically, the lengths of the sides of a measurement sample (30 mm×40 mm) in the MD and TD directions are measured, and the dimension obtained at 23° C. at 50% RH can be used as a reference. Further, the aforementioned sample is left at rest in water at approximately 30° C. for approximately 1 hour so that it is allowed to swell, and it is then removed from the water. Then, the size of the sample is measured, and a comparison is made, so as to obtain a dimensional change.

(Physical Property Values of Separation Membrane)

The air resistance of the separation membrane according to the present embodiment per thickness of 200 μm is 10000 sec/100 cc or more, preferably 50000 sec/100 cc or more, and more preferably 100000 sec/100 cc or more. The aforementioned air resistance can be measured by the method described in the after-mentioned Examples.

By setting the air resistance in the aforementioned range, the separation membrane according to the present embodiment has excellent ion permselectivity.

From the viewpoint of suppression of the impregnation of metal ion as an active material and also from the viewpoint of mechanical strength, the membrane thickness of the separation membrane according to the present embodiment is preferably 50 μm or more, more preferably 80 μm or more, further preferably 100 μm or more, and particularly preferably 150 μm or more. The membrane thickness of the aforementioned separation membrane can be obtained from the sum of the thickness of the microporous membrane and the thickness of the ion-exchange resin layer.

In addition, from the viewpoint of ensuring proton permeability, the membrane thickness is preferably 1000 μm or less, more preferably 500 μm or less, further preferably 400 μm or less, and particularly preferably 300 μm or less.

With regard to the separation membrane according to the present embodiment, it is preferable that the electrolyte membrane be disposed on the positive electrode side of the redox flow secondary battery because anti-oxidative degradation is suppressed and durability tends to be improved by such disposition.

The separation membrane according to the present embodiment has excellent ion permselectivity, low electrical resistance, and also excellent durability (mainly, resistance to oxidation by hydroxy radical), and thus, it exhibits excellent performance as a separation membrane for redox flow secondary battery.

EXAMPLES

Next, the present embodiment will be more specifically described in the following Examples and Comparative Examples. However, the present embodiment is not limited to the following examples, unless it exceeds the gist thereof.

[Method for Measuring Physical Property Values of Microporous Membrane]

(1) Thickness (μm) of Microporous Membrane

The thickness of the microporous membrane was measured using a micro-thickness measuring device (type:

KBN, terminal diameter: Φ5 mm, measurement pressure: 62.47 kPa), manufactured by TOYO SEIKI SEISAKU-SHO, LTD., at an ambient temperature of 23±2° C.

(2) Air Resistance (sec/100 cc)

The air resistance of the microporous membrane and that of the separation membrane were measured using a Gurley air resistance measurement apparatus (manufactured by TOYO SEIKI SEISAKU-SHO, LTD., G-B2(registered trademark)) in accordance with JIS P-8117. When the air resistance of a separation membrane according to an embodiment, in which the microporous membrane did not adhere to the ion-exchange resin membrane, was to be measured, these membranes were laminated on each other, and thereafter, the laminated membrane was equipped in the aforementioned air resistance measurement apparatus and the air resistance thereof was measured.

More specifically, the mass of an internal cylinder was set at 567 g, the diameter was set at 28.6 mm, and the time required for 100 mL of air to pass through an area of 645 mm$^2$ was then measured.

In a case where the measurement was not terminated even if 100,000 seconds had passed after initiation of the measurement, the air resistance was evaluated to be "100,000 or more."

(3) Electrical Resistance (Ω·cm$^2$/Sheet)

The electrical resistance of the microporous membrane was measured in accordance with JIS C-2313, in an aqueous solution of 28% by mass of diluted sulfuric acid at a temperature of 25±0.5° C.

(4) Porosity (%)

(i) Method for Analyzing Composition of Inorganic Filler in Microporous Membrane The composition ratio of the inorganic filler contained in the microporous membrane was calculated using a thermogravimetric analyzer TG/DT A220(registered trademark) manufactured by Seico Electronics Industrial Co., Ltd. Specifically, the weight of approximately 10 mg of a sample was initially measured under air current, and then, after the sample had been left at 550° C. for 60 minutes, the weight was measured again. A difference between the weights was defined as the mass of the inorganic filler, and the aforementioned composition ratio was calculated.

(ii) Calculation of Porosity

Porosity (%)=(1−(X/(Y×Z)))×100

X: the mass (g/m$^2$) of the membrane

Y: the specific gravity (g/cm$^3$) of the membrane which was calculated using the density of the resin, the density of the inorganic filler, and the composition ratio obtained by the above described method for analyzing the composition of the inorganic filler in the microporous membrane.

Z: membrane thickness (μm)

(5) Limiting Viscosity [η] of Polyolefin Used as Raw Material and Microporous Membrane The limiting viscosity [η] of a polyolefin used as a raw material and that of the microporous membrane were obtained by measuring the limiting viscosity [η] in a decalin solvent at 135° C. in accordance with ASTMD 4020.

It is to be noted that the limiting viscosity of the microporous membrane was obtained by measuring a sample obtained by the following method, as described below.

A microporous membrane was immersed in alcohol, and air was fully removed therefrom. Thereafter, the membrane was immersed in an aqueous solution of 20% caustic soda at 80° C. over a day and a night, and it was then washed with hot water at 60° C. Thereafter, the membrane was washed with running water over a day and a night. The resulting membrane was dried with a dryer that was set at 40° C. over a day and a night, so as to obtain a sample. The composition of the obtained sample was calculated based on the weight of approximately 10 mg of a dried sample that had been initially measured under air current and the weight of the sample measured after it had been left at 550° C. for 60 minutes, using a thermogravimetric analyzer TG/DT A220 manufactured by Seico Electronics Industrial Co., Ltd. Thereafter, the amount of the remaining inorganic filler was confirmed to be 1% by mass or less.

(6) Smoothness (sec)

Using an Ohken type air permeability/smoothness measurement device (EY0 type) manufactured by ASAHI SEIKO CO., LTD. according to JIS8155: 2010, the smoothness was measured for a measurement time of 240 seconds and at a room temperature of 23±2° C.

(7) Tensile Modulus, Tensile Breaking Strength, and Tensile Breaking Elongation of Microporous Membrane The MD/TD sample (form: 10 mm in width×100 mm in length) was measured in accordance with JIS K7127, using a tensile testing machine Autograph AG-A(registered trademark), manufactured by Shimadzu Corporation. In addition, with regard to the sample, a distance between chucks was set at 50 mm, and a scotch tape (manufactured by NITTO DENKO CS SYSTEM CORPORATION, trade name: N29) was adhered to one surface of both ends of the sample (each 25 mm). Moreover, in order to prevent the slipping of the sample during the test, a fluorine-containing rubber with a thickness of 1 mm was adhered to the inside of the chuck of the tensile testing machine.

The tensile breaking elongation (%) was obtained by dividing the amount of the membrane elongated (mm) before it had broken up by a distance between chucks (50 mm), and then multiplying the obtained value by 100. The tensile breaking strength (MPa) was obtained by dividing the strength at the time of breaking up by the cross-sectional area of the sample before initiation of the test.

The tensile modulus (N/cm) was evaluated based on the inclination of elongation of 1% to 4%. The coefficient of elasticity per cm of width was obtained by multiplying the coefficient of elasticity (N/cm$^2$) obtained from the inclination by the thickness of the microporous membrane before initiation of the test.

It is to be noted that the measurement was carried out at a temperature of 23±2° C., at a chuck pressure of 0.30 MPa, and at a tensile rate of 200 mm/min.

[Method for Measuring Physical Property Values of Ion-Exchange Resin Layer]

(1) Melt Flow Index of PFSA Resin Precursor

The melt flow index of the PFSA resin precursor was measured in accordance with ASTM: D1238 under measurement conditions of a temperature of 270° C. and a load of 2160 g.

(2) Measurement of Equivalent Weight EW of PFSA Resin 0.3 g of a PFSA resin was immersed at 25° C. in 30 mL of a saturated NaCl aqueous solution, and it was then left for 30 minutes while stirring it. Subsequently, free proton in the saturated NaCl aqueous solution was subjected to neutralization titration using phenolphthalein as an indicator and also using a 0.01 N sodium hydroxide aqueous solution. After completion of the neutralization, the obtained PFSA resin portion, in which the counterions of ion-exchange groups became sodium ions, was rinsed with pure water, and it was subjected to vacuum drying and then to weighing. The amount of material of sodium hydroxide used for the neutralization was defined as M (mmol), and the mass of the PFSA resin, in which the counterions of ion-exchange groups became sodium ions, was defined as W (mg). According to the following formula, the equivalent weight EW (g/eq) was obtained.

$$EW=(W/M)-22$$

(3) Membrane Thickness

A membrane sample was left at rest in a constant temperature and humidity room at 23° C. at 50% RH for 1 hour or more, and the thickness of the membrane was then measured using a membrane thickness measuring device (manufactured by TOYO SEIKI SEISAKU-SHO, LTD., trade name: "B-1").

(4) Measurement of Equilibrium Water Content

A dispersed liquid of PFSA resin was applied onto a clean glass board, and it was then dried at 150° C. for approximately 10 minutes. Thereafter, it was peeled from the board, so as to form a membrane with a thickness of approximately 30 μm. The formed membrane was left in water at 23° C. for approximately 3 hours, and it was then left in a room at 23° C. at relative humidity (RH) of 50% for 24 hours. Thereafter, the equilibrium water content was measured. Regarding a dried membrane used as a reference, a vacuum-dried membrane at 80° C. was used. The equilibrium water content was calculated from a change in the mass of the membrane.

[Method for Evaluating Separation Membrane]

(1) Measurement of Peel Strength

A double-stick tape (B) (manufactured by NICHIBAN CO., Ltd., Nicetack(registered trademark), trade name: NW-15) with a width of 15 mm was adhered to one surface of a slide glass (A) with a size of 76 mm in length×26 mm in width (manufactured by Matsunami Glass Ind., Ltd., trade name: 51112) at a position of the entire length direction and almost the center in the width direction, so that a measurement board was prepared. The non-test surface (C) of a separation membrane sample with a size of 70 mm in length×15 mm in width was adhered to the entire adhesive surface of the measurement board. A mending tape (E) (manufactured by Sumitomo 3 M Limited Company, Scotch (registered trademark), trade name: 810-3-102, width: 12 mm) having a length of 15 cm was adhered to the test surface (D) of the separation membrane sample at a position as shown in FIG. 2 by pressing it on the surface several times, so as to produce a test piece. The test piece was equipped in a tensile testing machine (manufactured by Shimadzu Corporation AG-A(trademark)), and the mending tape side was transferred in a tensile mode at a test rate of 100 mm/min. The mean value of peel strength in a peeling distance of 25 mm to 50 mm was measured.

(2) Charge and Discharge Test

A redox flow secondary battery was formed, such that liquid-permeable porous collector electrodes (used as a negative electrode and a positive electrode) were disposed on both sides of a separation membrane, and the electrodes were then pressed by pressing force, so that one part partitioned with the separation membrane was defined as a positive electrode cell and the other part was defined as a negative electrode cell, and the thickness of each cell could be ensured with a spacer. To the positive electrode cell, a positive electrode electrolytic solution composed of a sulfuric acid electrolytic solution including tetravalent vanadium ($V^{4+}$) and pentavalent vanadium ($V^{5+}$) was supplied. On the other hand, to the negative electrode cell, a negative electrode electrolytic solution including trivalent vanadium ($V^{3+}$) and divalent vanadium ($V^{2+}$) was supplied. Then, the charge and discharge of the battery were carried out.

A charge and discharge test was carried out using the battery formed as described above. An aqueous electrolytic solution having a total vanadium concentration of 2 mol/L and a total sulfate radical concentration of 4 mol/L was used. In addition, the thickness of each of the disposed positive electrode and negative electrode cells was 5 mm, and a porous felt which has a thickness of 5 mm and a bulk density of approximately 0.1 g/cm³ and is composed of carbon fibers was placed between both porous electrodes and the separation membrane. The charge and discharge test was carried out at a current density of 80 mA/cm². The cell electric resistivity was obtained according to an AC impedance method, which includes measuring the direct-current resistance value at an AC voltage of 10 mV and at a frequency of 20 kHz at the time of initiation of the discharge, and then multiplying the obtained value by the area of the electrode. Moreover, current efficiency was obtained as follows. That is to say, charge and discharge were carried out at a current density of 80 mA/cm². This was defined as one cycle, and this operation was repeated for 5 cycles, and the mean value of the 2 to 4 cycles was defined as current efficiency.

[Production of Ion-Exchange Resin Membrane A]

Ionomer Solution SS1100/5 (EW1100 (g/eq), hereinafter also referred to as simply "ion-exchange resin dispersed solution A"), manufactured by Asahi Kasei E-materials Corporation, was casted on a polyimide film used as a carrier sheet according to a known ordinary method, and hot air at 120° C. was then applied thereto (20 minutes), so that the solvent was almost completely blown away and the residue was dried to obtain a membrane. The obtained membrane was further subjected to a heat treatment in a hot air atmosphere under conditions of 160° C. and 10 minutes, so as to obtain an ion-exchange resin membrane having a thickness of 17 μm. The obtained membrane was referred to as an ion-exchange resin membrane A. The equilibrium water content of the obtained membrane was 8% by mass, and the maximum water content of the ion-exchange resin membrane A at 25° C. in water for 3 hours was 17% by mass. It is to be noted that the maximum value observed during the measurement of the equilibrium water content was defined as the maximum water content.

[Production of Ion-Exchange Resin Membrane B]

(1) (Production of PFSA Resin Precursor)

An aqueous solution of 10% $C_7F_{15}COONH_4$ and pure water were charged into a stirring-type autoclave made of stainless steel, and a vacuum treatment and nitrogen replacement were fully carried out. Thereafter, tetrafluoroethylene ($CF_2=CF_2$) (hereinafter also abbreviated as "TFE") gas was introduced into the autoclave, and the pressure (cage pressure) was increased to 0.7 MPa. Subsequently, an ammonium persulfate aqueous solution was poured into the autoclave to initiate polymerization. In order to refill TFE consumed by polymerization, TFE gas was continuously supplied, so that the pressure in the autoclave was kept at 0.7 MPa. In addition, $CF_2=CFO\ (CF_2)_2—SO_2F$ in an amount corresponding to the mass ratio to the supplied TFE that was 0.70 was continuously supplied to carry out polymerization. Polymerization conditions were adjusted in an optimal range, so as to obtain powders of perfluorocarbon sulfonic acid resin precursor. The MFI of the obtained PFSA resin precursor powder A1 was 1.5 (g/10 min).

(2) Production of Perfluorocarbon Sulfonic Acid Resin and Dispersed Liquid Thereof The obtained PFSA resin precursor powder was allowed to come into contact with an aqueous solution, in which potassium hydroxide (15% by mass) and methyl alcohol (50% by mass) had been dissolved, at 80° C. for 20 hours, so that a hydrolysis treatment was carried out. Thereafter, it was immersed in water at 60° C. for 5 hours. Subsequently, a treatment of immersing it in a 2 N hydrochloric acid aqueous solution at 60° C. for 1 hour was repeated 5 times, while the hydrochloric acid aqueous solution was replaced with fresh one for every operation. Thereafter, the resultant was washed with ion-exchange water and was then dried. Thereby, PFSA resin A1 having a sulfonic acid group (SO$_3$H) and having a structure shown in formula (1) was obtained. The EW of the obtained PFSA resin A1 was 720 (g/eq).

The obtained PFSA resin A1 was placed in a 5-L autoclave, together with an ethanol aqueous solution (water:ethanol=50:50 (mass ratio)), and the autoclave was then hermetically closed. While the solution was stirred by a blade, the temperature was increased to 160° C., and it was then retained for 5 hours. Thereafter, the autoclave was naturally cooled, so as to produce a uniformly dispersed liquid of 5% by mass of a PFSA resin. Subsequently, 100 g of pure water was added to 100 g of this PFSA resin dispersed liquid, and the obtained solution was then stirred. After that, the resulting solution was heated to 80° C., and was then concentrated to a solid concentration of 20% by mass, while stirring it.

The obtained PFSA resin dispersed liquid was referred to as a dispersed liquid (ASF1).

(3) Production of Ion-Exchange Resin Membrane

The obtained dispersed liquid (ASF1) was casted on a polyimide film used as a carrier sheet according to a known ordinary method, and hot air at 120° C. was then applied thereto (20 minutes), so that the solvent was almost completely blown away and the residue was then dried to obtain a membrane. The obtained membrane was further subjected to a heat treatment in a hot air atmosphere under conditions of 160° C. and 10 minutes, so as to obtain an ion-exchange resin membrane having a thickness of 20 µm. The obtained membrane was referred to as an ion-exchange resin membrane B. The equilibrium water content of the obtained ion-exchange resin membrane B was 10% by mass, and the maximum water content of the electrolyte membrane at 25° C. in water for 3 hours was 20% by mass.

[Production Example of Microporous Membrane 1]

A microporous membrane A was produced by the following method.

10% by mass of ultrahigh molecular weight polyethylene ([η]: 11.5 dl/g, density: 0.94 g/cm$^3$), 10% by mass of high-density polyethylene ([η]: 2.8 dl/g, density: 0.96 g/cm$^3$), 25% by mass of fine powders of hydrophilic wet silica (dispersed mean particle diameter: 2.00 µm), and 55% by mass of bis(2-ethylhexyl) phthalate (DOP) were mixed using Super Mixer. A T-die with a width of 450 mm was equipped into a twin screw extruder (30 mmΦ), and the obtained mixture was then molded and extruded at a T-die discharge resin temperature of 220° C. At the time, in order to maintain dimensional stability, melt extrusion was carried out while keeping a gear pump fore pressure constant via a gear pump. The resin mixture extruded from the T-die was molded into a sheet having a membrane thickness of 200 µm by rolling with a calender roll having a temperature adjusted to 140° C.

The molded sheet was immersed in methylene chloride for 1 hour, so that bis(2-ethylhexyl) phthalate (DOP) was extracted and was then dried. The physical properties of the thus obtained microporous membrane A are shown in Table 1. It is to be noted that the ultrahigh molecular weight polyethylene and the high-density polyethylene are both referred to as simply "polyethylene" in Table 1.

[Production Example of Microporous Membrane 2]

A microporous membrane B was produced by the following method.

6.6% by mass of ultrahigh molecular weight polyethylene ([η]: 11.5 dl/g, density: 0.94 g/cm$^3$), 26.4% by mass of high-density polyethylene ([η]: 2.8 dl/g, density: 0.96 g/cm$^3$), 22% by mass of fine powders of hydrophilic wet silica (dispersed mean particle diameter: 2.00 µm), and 45% by mass of bis(2-ethylhexyl) phthalate (DOP) were mixed using Super Mixer. A T-die with a width of 450 mm was equipped into a twin screw extruder (30 mmΦ), and the obtained mixture was then molded and extruded at a T-die discharge resin temperature of 220° C. At the time, in order to maintain dimensional stability, melt extrusion was carried out while keeping a gear pump fore pressure constant via a gear pump. The resin mixture extruded from the T-die was molded into a sheet having a membrane thickness of 100 µm by rolling with a calender roll having a temperature adjusted to 140° C.

The molded sheet was immersed in methylene chloride for 1 hour, so that bis(2-ethylhexyl) phthalate (DOP) was extracted and was then dried. The physical properties of the thus obtained microporous membrane B are shown in Table 1.

[Production Example of Microporous Membrane 3]

A microporous membrane C was produced by roll-stretching the microporous membrane A at a roll temperature of 150° C., to result in a total longitudinal stretching magnification of 2 times. The physical properties of the thus obtained microporous membrane C are shown in Table 1.

[Production Example of Microporous Membrane 4]

A microporous membrane D was produced by the following method.

4.5% by mass of ultrahigh molecular weight polyethylene ([η]: 11.5 dl/g, density: 0.94 g/cm$^3$), 40.5% by mass of high-density polyethylene ([η]: 2.8 dl/g, density: 0.96 g/cm$^3$), 10% by mass of fine powders of hydrophilic wet silica (dispersed mean particle diameter: 2.00 µm), and 45% by mass of bis(2-ethylhexyl) phthalate (DOP) were mixed using Super Mixer. A T-die with a width of 450 mm was equipped into a twin screw extruder (30 mmΦ), and the obtained mixture was then molded and extruded at a T-die discharge resin temperature of 220° C. At the time, in order to maintain dimensional stability, melt extrusion was carried out while keeping a gear pump fore pressure constant via a gear pump. The resin mixture extruded from the T-die was molded into a sheet having a membrane thickness of 200 µm by rolling with a calender roll having a temperature adjusted to 140° C.

The molded sheet was immersed in methylene chloride for 1 hour, so that bis(2-ethylhexyl) phthalate (DOP) was extracted and was then dried. The physical properties of the thus obtained microporous membrane D are shown in Table 1.

[Production Example of Microporous Membrane 5]

The hydrophilic wet silica was removed from the microporous membrane A by the procedures applied in the above described measurement method (5), so as to obtain a microporous membrane E composed only of polyolefin (polyethylene) in which the amount of the remaining silica was 1.0% or less. The physical properties of the thus obtained microporous membrane E are shown in Table 1.

[Production Example of Microporous Membrane 6]

A microporous membrane F was produced by the following method.

8% by mass of ultrahigh molecular weight polyethylene ([η]: 11.5 dl/g, density: 0.94 g/cm$^3$), 15% by mass of high-density polyethylene ([η]: 2.8 dl/g, density: 0.96 g/cm³), 25% by mass of fine powders of hydrophilic wet silica (dispersed mean particle diameter: 2.00 μm), and 52% by mass of bis(2-ethylhexyl) phthalate (DOP) were mixed using Super Mixer. A T-die with a width of 450 mm was equipped into a twin screw extruder (30 mmΦ), and the obtained mixture was then molded and extruded at a T-die discharge resin temperature of 220° C. At the time, in order to maintain dimensional stability, melt extrusion was carried out while keeping a gear pump fore pressure constant via a gear pump. The resin mixture extruded from the T-die was molded into a sheet having a membrane thickness of 400 μm by rolling with a calender roll having a temperature adjusted to 140° C.

The molded sheet was immersed in methylene chloride for 1 hour, so that bis(2-ethylhexyl) phthalate (DOP) was extracted and was then dried. The physical properties of the thus obtained microporous membrane F are shown in Table 1.

[Production Example of Microporous Membrane 7]

A microporous membrane G was produced by the following method.

16% by mass of ultrahigh molecular weight polyethylene ([η]: 11.5 dl/g, density: 0.94 g/cm³), 16% by mass of high-density polyethylene ([η]: 2.8 dl/g, density: 0.96 g/cm³), 25% by mass of fine powders of hydrophilic silica (dispersed mean particle diameter: 2.00 μm), and 43% by mass of bis(2-ethylhexyl) phthalate (DOP) were mixed using Super Mixer. A T-die with a width of 450 mm was equipped into a twin screw extruder (30 mmΦ), and the obtained mixture was then molded and extruded at a T-die discharge resin temperature of 220° C. At the time, in order to maintain dimensional stability, melt extrusion was carried out while keeping a gear pump pressure constant via a gear pump. The resin mixture extruded from the T-die was molded into a sheet having a membrane thickness of 300 μm by rolling with a calender roll having a temperature adjusted to 140° C.

The molded sheet was immersed in methylene chloride for 1 hour, so that bis(2-ethylhexyl) phthalate (DOP) was extracted and was then dried. The physical properties of the thus obtained microporous membrane G are shown in Table 1.

[Production Example of Microporous Membrane 8]

A microporous membrane H was produced by the following method.

10% by mass of ultrahigh molecular weight polyethylene ([η]: 11.5 dl/g, density: 0.94 g/cm³), 10% by mass of high-density polyethylene ([η]: 2.8 dl/g, density: 0.96 g/cm³), 25% by mass of fine powders of hydrophilic silica (dispersed mean particle diameter: 2.00 μm), and 55% by mass of bis(2-ethylhexyl) phthalate (DOP) were mixed using Super Mixer. A T-die with a width of 450 mm was equipped into a twin screw extruder (30 mmΦ), and the obtained mixture was then molded and extruded at a T-die discharge resin temperature of 220° C. At the time, in order to maintain dimensional stability, melt extrusion was carried out while keeping a gear pump pressure constant via a gear pump. The resin mixture extruded from the T-die was molded into a sheet having a membrane thickness of 200 μm by rolling with a calender roll having a temperature adjusted to 140° C.

The molded sheet was immersed in methylene chloride for 1 hour, so that bis(2-ethylhexyl) phthalate (DOP) was extracted and was then dried. The physical properties of the thus obtained microporous membrane H are shown in Table 1.

[Production Example of Microporous Membrane 9]

A microporous membrane I was produced by the following method.

16% by mass of ultrahigh molecular weight polyethylene ([η]: 11.5 dl/g, density: 0.94 g/cm³), 16% by mass of high-density polyethylene ([η]: 2.8 dl/g, density: 0.96 g/cm³), 25% by mass of fine powders of hydrophilic silica (dispersed mean particle diameter: 2.00 μm), and 43% by mass of bis(2-ethylhexyl) phthalate (DOP) were mixed using Super Mixer. A T-die with a width of 450 mm was equipped into a twin screw extruder (30 mmΦ), and the obtained mixture was then molded and extruded at a T-die discharge resin temperature of 220° C. At the time, in order to maintain dimensional stability, melt extrusion was carried out while keeping a gear pump pressure constant via a gear pump. The resin mixture extruded from the T-die was molded into a sheet having a membrane thickness of 335 μm by rolling with a calender roll having a temperature adjusted to 140° C.

The molded sheet was immersed in methylene chloride for 1 hour, so that bis(2-ethylhexyl) phthalate (DOP) was extracted and was then dried. The physical properties of the thus obtained microporous membrane I are shown in Table 1.

[Production Example of Microporous Membrane 10]

A microporous membrane J was produced by the following method.

22% by mass of ultrahigh molecular weight polyethylene ([η]: 11.5 dl/g, density: 0.94 g/cm³), 22% by mass of high-density polyethylene ([η]: 2.8 dl/g, density: 0.96 g/cm³), 25% by mass of fine powders of hydrophilic silica (dispersed mean particle diameter: 2.00 μm), and 31% by mass of bis(2-ethylhexyl) phthalate (DOP) were mixed using Super Mixer. A T-die with a width of 450 mm was equipped into a twin screw extruder (30 mmΦ), and the obtained mixture was then molded and extruded at a T-die discharge resin temperature of 220° C. At the time, in order to maintain dimensional stability, melt extrusion was carried out while keeping a gear pump pressure constant via a gear pump. The resin mixture extruded from the T-die was molded into a sheet having a membrane thickness of 305 μm by rolling with a calender roll having a temperature adjusted to 140° C.

The molded sheet was immersed in methylene chloride for 1 hour, so that bis(2-ethylhexyl) phthalate (DOP) was extracted and was then dried. The physical properties of the thus obtained microporous membrane J are shown in Table 1.

[Production Example of Microporous Membrane 11]

A microporous membrane K was produced by the following method.

10% by mass of ultrahigh molecular weight polyethylene ([η]: 11.5 dl/g, density: 0.94 g/cm³), 10% by mass of high-density polyethylene ([η]: 2.8 dl/g, density: 0.96 g/cm³), 25% by mass of fine powders of hydrophilic wet silica (dispersed mean particle diameter: 2.00 μm), and 55% by mass of bis(2-ethylhexyl) phthalate (DOP) were mixed using Super Mixer. A T-die with a width of 450 mm was equipped into a twin screw extruder (30 mmΦ), and the obtained mixture was then molded and extruded at a T-die discharge resin temperature of 220° C. At the time, in order to maintain dimensional stability, melt extrusion was carried out while keeping a gear pump fore pressure constant via a gear pump. The resin mixture extruded from the T-die was molded into a sheet having a membrane thickness of 100 μm by rolling with a calender roll having a temperature adjusted to 140° C.

The molded sheet was immersed in methylene chloride for 1 hour, so that bis(2-ethylhexyl) phthalate (DOP) was extracted and was then dried. The physical properties of the thus obtained microporous membrane K are shown in Table 1.

[Production Example of Microporous Membrane 12]

35% by mass of a polyvinylidene fluoride resin, SOLEF (registered trademark) 6010 ([η]: 320,000 (catalog value), manufactured by Solvay Solexis), 23% by mass of fine powders of hydrophilic wet silica (dispersed mean particle diameter: 2.00 μm), 29% by mass of bis(2-ethylhexyl) phthalate (DOP), and 13% by mass of dibutyl phthalate were mixed using Super Mixer. A T-die with a width of 450 mm was equipped into a twin screw extruder (30 mmΦ), and the obtained mixture was then molded and extruded at a T-die discharge resin temperature of 250° C. At the time, in order to maintain dimensional stability, melt extrusion was carried out while keeping a gear pump fore pressure constant via a gear pump. The resin mixture extruded from the T-die was molded into a sheet having a membrane thickness of 200 μm by rolling with a calender roll having a temperature adjusted to 140° C.

The molded sheet was immersed in methylene chloride for 1 hour, so that bis(2-ethylhexyl) phthalate (DOP) and dibutyl phthalate were extracted, followed by drying. The physical properties of the thus obtained microporous membrane L are shown in Table 1. It is to be noted that SOLEF(registered trademark) 6010 is simply referred to as "PVDF" in Table 1.

TABLE 1

| Microporous membrane | Constitutional materials for microporous membrane | | Mass of resin/inorganic filler | | Membrane thickness μm | Porosity % | Air resistance Sec/100 cc |
|---|---|---|---|---|---|---|---|
| | Resin | Inorganic filler | Resin | Inorganic filler | | | |
| Microporous membrane A | Polyethylene | Hydrophilic silica | 44 | 56 | 200 | 67 | 1300 |
| Microporous membrane B | Polyethylene | Hydrophilic silica | 60 | 40 | 100 | 55 | 2300 |
| Microporous membrane C | Polyethylene | Hydrophilic silica | 44 | 56 | 180 | 80 | 10 |
| Microporous membrane D | Polyethylene | Hydrophilic silica | 70 | 30 | 100 | 45 | 10000 |
| Microporous membrane E | Polyethylene | None | 100 | 0 | 180 | 70 | 270 |
| Microporous membrane F | Polyethylene | Hydrophilic silica | 48 | 52 | 400 | 58 | 2400 |
| Microporous membrane G | Polyethylene | Hydrophilic silica | 56 | 44 | 296 | 56 | 4000 |
| Microporous membrane H | Polyethylene | Hydrophilic silica | 45 | 55 | 198 | 64 | 1000 |
| Microporous membrane I | Polyethylene | Hydrophilic silica | 56 | 44 | 335 | 56 | 4020 |
| Microporous membrane J | Polyethylene | Hydrophilic silica | 63 | 37 | 305 | 51 | 6270 |
| Microporous membrane K | Polyethylene | Hydrophilic silica | 44 | 56 | 100 | 67 | 650 |
| Microporous membrane L | PVDF | Hydrophilic silica | 60 | 40 | 200 | 63 | 1500 |

| Microporous membrane | Electrical resistance Ω·cm²/sheet | Smoothness Sec | Tensile modulus MD [N/cm] | Tensile modulus TD [N/cm] | Tensile breaking strength MD [MPa] | Tensile breaking strength TD [MPa] | Tensile breaking elongation MD [%] | Tensile breaking elongation TD [%] |
|---|---|---|---|---|---|---|---|---|
| Microporous membrane A | 0.05 | 6400 | 117 | 52 | 7 | 4.4 | 290 | 260 |
| Microporous membrane B | 0.095 | 12000 | 120 | 75 | 8 | 4.6 | 310 | 280 |
| Microporous membrane C | 0.005 | 180 | 108 | 47 | 3 | 1.7 | 18 | 53 |
| Microporous membrane D | 0.5 | 17000 | 150 | 90 | 8.3 | 4.8 | 310 | 280 |
| Microporous membrane E | 1 | 7500 | 110 | 45 | 7.4 | 5.2 | 240 | 270 |
| Microporous membrane F | 0.11 | 8500 | 220 | 220 | 6.4 | 4.7 | 220 | 240 |
| Microporous membrane G | 0.19 | 11000 | 190 | 171 | 6.9 | 4.3 | 254 | 296 |
| Microporous membrane H | 0.03 | 7000 | 140 | 92 | 7.4 | 4.6 | 283 | 198 |
| Microporous membrane I | 0.19 | 11000 | 210 | 202 | 6.7 | 4.2 | 242 | 335 |
| Microporous membrane J | 0.30 | 14000 | 195 | 179 | 6.8 | 4.3 | 251 | 305 |
| Microporous membrane K | 0.03 | 6400 | 59 | 26 | 8.0 | 5.0 | 280 | 270 |

TABLE 1-continued

| | | | | | | | | |
|---|---|---|---|---|---|---|---|---|
| Microporous membrane L | 0.08 | 5800 | 100 | 40 | 6.0 | 4.0 | 250 | 220 |

Example 1

An ion-exchange resin dispersed solution A was applied to one surface of a microporous membrane A, using a gravure coater, and it was then subjected to a drying treatment at 60° C. The obtained membrane was immobilized in a frame made of metal, and a heat treatment was then performed thereon at 80° C. for 12 hours to obtain a separation membrane. The air resistance of the obtained separation membrane per thickness that was 200 μm (hereinafter also referred to as simply "air resistance," the same applies also to Table 2) was 100,000 sec/100 cc or more.

Example 2

A microporous membrane A was adhered to an ion-exchange resin membrane B by pressure-bonding them at 120° C. at a contact pressure of 7 MPa, using a vacuum pressing apparatus, so as to obtain a separation membrane. The air resistance of the obtained separation membrane was 100,000 sec/100 cc or more.

Example 3

An ion-exchange resin membrane B was laminated on the surface of a microporous membrane A, and the resulting membrane was used as a separation membrane for vanadium redox flow secondary battery, in which the ion-exchange membrane side was disposed on the positive electrode side. Since the microporous membrane A was closely contacted with the ion-exchange resin membrane B in the redox flow secondary battery by applying a pressing force to a liquid-permeable porous electrode, they functioned as a separation membrane. It is to be noted that it is described in Table 2 that the microporous membrane A was combined with the ion-exchange resin membrane B by "lamination" as described above (the same applies below).

Example 4

A hydrocarbon-based anion-exchange membrane, NEOSEPTA AMX (membrane thickness: 150 μm, hereinafter also referred to as an "ion-exchange membrane C"), manufactured by Tokuyama Corporation, was laminated on the surface of a microporous membrane A, and the resulting membrane was used as a separation membrane for vanadium redox flow secondary battery, in which the ion-exchange membrane side was disposed on the positive electrode side. Since the microporous membrane A was closely contacted with the ion-exchange resin membrane C in the redox flow secondary battery by applying a pressing force to a liquid-permeable porous electrode, they functioned as a separation membrane.

Example 5

A separation membrane was obtained by the same method as that of Example 2 with the exception that a microporous membrane B was used instead of the microporous membrane A of Example 2. The air resistance of the obtained separation membrane was 100,000 sec/100 cc or more.

Example 6

A separation membrane was obtained by the same method as that of Example 3 with the exception that a microporous membrane B was used instead of the microporous membrane A of Example 3.

Example 7

A separation membrane was obtained by the same method as that of Example 4 with the exception that a microporous membrane B was used instead of the microporous membrane A of Example 4.

Example 8

A separation membrane was obtained by the same method as that of Example 3 with the exception that a microporous membrane C was used instead of the microporous membrane A of Example 3.

Example 9

A separation membrane was obtained by the same method as that of Example 4 with the exception that a microporous membrane C was used instead of the microporous membrane A of Example 4.

Example 10

A separation membrane was obtained by the same method as that of Example 2 with the exception that a microporous membrane F was used instead of the microporous membrane A of Example 2.

Example 11

A separation membrane was obtained by the same method as that of Example 3 with the exception that a microporous membrane F was used instead of the microporous membrane A of Example 3.

Example 12

An ion-exchange resin membrane A was laminated on the surface of a microporous membrane A, and the resulting membrane was used as a separation membrane for vanadium redox flow secondary battery, in which the ion-exchange membrane side was disposed on the positive electrode side. Since the microporous membrane A was closely contacted with the ion-exchange resin membrane A in the redox flow secondary battery, in which the ion-exchange membrane side was disposed on the positive electrode, by applying a pressing force to a liquid-permeable porous electrode, they functioned as a separation membrane.

Example 13

A separation membrane was obtained by the same method as that of Example 1, with the exception that a microporous membrane B was used instead of the microporous membrane A of Example 1. The air resistance of the obtained separation membrane was 100,000 sec/100 cc or more.

Example 14

A separation membrane was obtained by the same method as that of Example 12, with the exception that a microporous membrane B was used instead of the microporous membrane A of Example 12. The air resistance of the obtained separation membrane was 100,000 sec/100 cc or more.

Example 15

A separation membrane was obtained by the same method as that of Example 1, with the exception that a microporous membrane G was used instead of the microporous membrane A of Example 1. The air resistance of the obtained separation membrane was 100,000 sec/100 cc or more.

Example 16

A separation membrane was obtained by the same method as that of Example 12, with the exception that a microporous membrane G was used instead of the microporous membrane A of Example 12. The air permeability of the obtained separation membrane was 100,000 sec/100 cc or more.

Example 17

A separation membrane was obtained by the same method as that of Example 3, with the exception that a microporous membrane G was used instead of the microporous membrane A of Example 3. The air resistance of the obtained separation membrane was 100,000 sec/100 cc or more.

Example 18

A separation membrane was obtained by the same method as that of Example 2, with the exception that a microporous membrane G was used instead of the microporous membrane A of Example 2. The air resistance of the obtained separation membrane was 100,000 sec/100 cc or more.

Example 19

A separation membrane was obtained by the same method as that of Example 4, with the exception that a microporous membrane G was used instead of the microporous membrane A of Example 4. The air permeability of the obtained separation membrane was 100,000 sec/100 cc or more.

Example 20

A separation membrane was obtained by the same method as that of Example 1, with the exception that a microporous membrane H was used instead of the microporous membrane A of Example 1. The air resistance of the obtained separation membrane was 100,000 sec/100 cc or more.

Example 21

A separation membrane was obtained by the same method as that of Example 12, with the exception that a microporous membrane H was used instead of the microporous membrane A of Example 12. The air resistance of the obtained separation membrane was 100,000 sec/100 cc or more.

Example 22

A separation membrane was obtained by the same method as that of Example 3, with the exception that a microporous membrane H was used instead of the microporous membrane A of Example 3. The air resistance of the obtained separation membrane was 100,000 sec/100 cc or more.

Example 23

A separation membrane was obtained by the same method as that of Example 2, with the exception that a microporous membrane H was used instead of the microporous membrane A of Example 2. The air resistance of the obtained separation membrane was 100,000 sec/100 cc or more.

Example 24

A separation membrane was obtained by the same method as that of Example 4, with the exception that a microporous membrane H was used instead of the microporous membrane A of Example 4. The air resistance of the obtained separation membrane was 100,000 sec/100 cc or more.

Example 25

A separation membrane was obtained by the same method as that of Example 1, with the exception that a microporous membrane I was used instead of the microporous membrane A of Example 1. The air permeability of the obtained separation membrane was 100,000 sec/100 cc or more.

Example 26

A separation membrane was obtained by the same method as that of Example 12, with the exception that a microporous membrane I was used instead of the microporous membrane A of Example 12. The air resistance of the obtained separation membrane was 100,000 sec/100 cc or more.

Example 27

A separation membrane was obtained by the same method as that of Example 3, with the exception that a microporous membrane I was used instead of the microporous membrane A of Example 3. The air resistance of the obtained separation membrane was 100,000 sec/100 cc or more.

Example 28

A separation membrane was obtained by the same method as that of Example 2, with the exception that a microporous membrane I was used instead of the microporous membrane A of Example 2. The air resistance of the obtained separation membrane was 100,000 sec/100 cc or more.

Example 29

A separation membrane was obtained by the same method as that of Example 4, with the exception that a microporous membrane I was used instead of the microporous membrane A of Example 4. The air resistance of the obtained separation membrane was 100,000 sec/100 cc or more.

Example 30

A separation membrane was obtained by the same method as that of Example 1, with the exception that a microporous membrane J was used instead of the microporous membrane A of Example 1. The air resistance of the obtained separation membrane was 100,000 sec/100 cc or more.

Example 31

A separation membrane was obtained by the same method as that of Example 12, with the exception that a microporous membrane J was used instead of the microporous membrane A of Example 12. The air permeability of the obtained separation membrane was 100,000 sec/100 cc or more.

Example 32

A separation membrane was obtained by the same method as that of Example 3, with the exception that a microporous membrane J was used instead of the microporous membrane A of Example 3. The air resistance of the obtained separation membrane was 100,000 sec/100 cc or more.

Example 33

A separation membrane was obtained by the same method as that of Example 2, with the exception that a microporous membrane J was used instead of the microporous membrane A of Example 2. The air resistance of the obtained separation membrane was 100,000 sec/100 cc or more.

Example 34

A separation membrane was obtained by the same method as that of Example 4, with the exception that a microporous membrane J was used instead of the microporous membrane A of Example 4. The air resistance of the obtained separation membrane was 100,000 sec/100 cc or more.

Example 35

A separation membrane was obtained by the same method as that of Example 2, with the exception that a microporous membrane K was used instead of the microporous membrane A of Example 2. The air resistance of the obtained separation membrane was 100,000 sec/100 cc or more.

Example 36

A separation membrane was obtained by the same method as that of Example 3, with the exception that a microporous membrane L was used instead of the microporous membrane A of Example 3. The air resistance of the separation membrane was 100,000 or more.

Comparative Example 1

A separation membrane was obtained by the same method as that of Example 1, with the exception that a microporous membrane D was used instead of the microporous membrane A of Example 1. The air resistance of the obtained separation membrane was 100,000 sec/100 cc or more.

Comparative Example 2

A separation membrane was obtained by the same method as that of Example 2, with the exception that a microporous membrane D was used instead of the microporous membrane A of Example 2. The air resistance of the obtained separation membrane was 100,000 sec/100 cc or more.

Comparative Example 3

A separation membrane was obtained by the same method as that of Example 3, with the exception that a microporous membrane D was used instead of the microporous membrane A of Example 3.

Comparative Example 4

A separation membrane was obtained by the same method as that of Example 4, with the exception that a microporous membrane D was used instead of the microporous membrane A of Example 4.

Comparative Example 5

A separation membrane was obtained by the same method as that of Example 1, with the exception that a microporous membrane E was used instead of the microporous membrane A of Example 1. The air resistance of the obtained separation membrane was 100,000 sec/100 cc or more.

Comparative Example 6

A separation membrane was obtained by the same method as that of Example 2, with the exception that a microporous membrane E was used instead of the microporous membrane A of Example 2. The air resistance of the obtained separation membrane was 100,000 sec/100 cc or more.

Comparative Example 7

A separation membrane was obtained by the same method as that of Example 3, with the exception that a microporous membrane E was used instead of the microporous membrane A of Example 3.

Comparative Example 8

A separation membrane was obtained by the same method as that of Example 4, with the exception that a microporous membrane E was used instead of the microporous membrane A of Example 4.

Comparative Example 9

A microporous membrane A that was immersed in an ion-exchange resin dispersed solution A was placed in a vacuum desiccator, and deaeration was then carried out for 2 hours. Thereafter, the microporous membrane A was removed from the solution, and it was then dried in air. Thereafter, it was dried at 80° C. in a high-temperature tank for 2 hours. The air resistance of the obtained separation membrane per thickness that was 200 µm was 2600 sec/100 cc, and current efficiency was 78% after 200 cycles.

Comparative Example 10

A separation membrane was obtained by the same method as that of Example 12, with the exception that a microporous membrane D was used instead of the microporous membrane A of Example 12. The air permeability of the obtained separation membrane was 100,000 sec/100 cc or more.

Next, each separation membrane was used as a separation membrane for vanadium redox flow secondary battery, in which the ion-exchange membrane side was disposed on the positive electrode side, and a charge and discharge test was carried out. Specifically, the cell electric resistivity and current efficiency were measured. The obtained charge and discharge test results are shown in Table 2.

Subsequently, using the aforementioned separation membrane, charge and discharge were carried out for 200 cycles, and the cell electric resistivity and current efficiency were then measured again. By examining the changes, a durability test was carried out. The obtained charge and discharge test results are shown in Table 2.

Subsequently, after charge and discharge had been carried out for 200 cycles, the cell was disintegrated, and the appearance of the separation membrane was then observed. When an unwrinkled area in the area of a portion contacted with a carbon electrode was estimated to be 70% or more by visual observation, it was evaluated as "A." When such an unwrinkled area was estimated to be 50% or more and less than 70%, it was evaluated as "B." When such an unwrinkled area was estimated to be 30% or more and less than 50%, it was evaluated as "C." When such an unwrinkled area was estimated to be 10% or more and less than 30%, it was evaluated as "D." When such an unwrinkled area was estimated to be less than 10%, it was evaluated as "E."

The evaluation results of the above described Examples 1 to 36 and Comparative Examples 1 to 10 are shown in Table 2.

TABLE 2

| Example No. | Microporous membrane | Ion-exchange resin/membrane | Combining method | Microporous membrane Smoothness Sec | Tensile modulus MD [N/cm] | Tensile modulus TD [N/cm] |
|---|---|---|---|---|---|---|
| Example 1 | A | A | Coating | 6400 | 117 | 52 |
| Example 2 | A | B | Pressure bonding | 6400 | 117 | 52 |
| Example 3 | A | B | Lamination | 6400 | 117 | 52 |
| Example 4 | A | C | Lamination | 6400 | 117 | 52 |
| Example 5 | B | B | Pressure bonding | 12000 | 120 | 75 |
| Example 6 | B | B | Lamination | 12000 | 120 | 75 |
| Example 7 | B | C | Lamination | 12000 | 120 | 75 |
| Example 8 | C | B | Lamination | 180 | 108 | 47 |
| Example 9 | C | C | Lamination | 180 | 108 | 47 |
| Example 10 | F | B | Pressure bonding | 8500 | 220 | 220 |
| Example 11 | F | B | Lamination | 8500 | 220 | 220 |
| Example 12 | A | A | Lamination | 6400 | 117 | 52 |
| Example 13 | B | A | Coating | 12000 | 120 | 75 |
| Example 14 | B | A | Lamination | 12000 | 120 | 75 |
| Example 15 | G | A | Coating | 11000 | 190 | 171 |
| Example 16 | G | A | Lamination | 11000 | 190 | 171 |
| Example 17 | G | B | Lamination | 11000 | 190 | 171 |
| Example 18 | G | B | Pressure bonding | 11000 | 190 | 171 |
| Example 19 | G | C | Lamination | 11000 | 190 | 171 |
| Example 20 | H | A | Coating | 7000 | 140 | 92 |
| Example 21 | H | A | Lamination | 7000 | 140 | 92 |
| Example 22 | H | B | Lamination | 7000 | 140 | 92 |
| Example 23 | H | B | Pressure bonding | 7000 | 140 | 92 |
| Example 24 | H | C | Lamination | 7000 | 140 | 92 |
| Example 25 | I | A | Coating | 11000 | 210 | 202 |
| Example 26 | I | A | Lamination | 11000 | 210 | 202 |
| Example 27 | I | B | Lamination | 11000 | 210 | 202 |
| Example 28 | I | B | Pressure bonding | 11000 | 210 | 202 |
| Example 29 | I | C | Lamination | 11000 | 210 | 202 |
| Example 30 | J | A | Coating | 14000 | 195 | 179 |
| Example 31 | J | A | Lamination | 14000 | 195 | 179 |
| Example 32 | J | B | Lamination | 14000 | 195 | 179 |
| Example 33 | J | B | Pressure bonding | 14000 | 195 | 179 |
| Example 34 | J | C | Lamination | 14000 | 195 | 179 |
| Example 35 | K | B | Pressure bonding | 6400 | 59 | 26 |
| Example 36 | L | B | Lamination | 5800 | 100 | 40 |
| Comparative Example 1 | D | A | Coating | 17000 | 150 | 90 |
| Comparative Example 2 | D | B | Pressure bonding | 17000 | 150 | 90 |
| Comparative Example 3 | D | B | Lamination | 17000 | 150 | 90 |
| Comparative Example 4 | D | C | Lamination | 17000 | 150 | 90 |
| Comparative Example 5 | E | A | Coating | 7500 | 110 | 45 |

TABLE 2-continued

| | | | | | | |
|---|---|---|---|---|---|---|
| Comparative Example 6 | E | B | Pressure bonding | 7500 | 110 | 45 |
| Comparative Example 7 | E | B | Lamination | 7500 | 110 | 45 |
| Comparative Example 8 | E | C | Lamination | 7500 | 110 | 45 |
| Comparative Example 9 | A | A | Immersion | 6400 | 117 | 52 |
| Comparative Example 10 | D | A | Lamination | 17000 | 150 | 90 |

| | Separation membrane | | | Redox flow secondary battery charge and discharge test | | | | |
|---|---|---|---|---|---|---|---|---|
| Example No. | Membrane thickness μm | Air resistance Sec/100 cc | Peel strength gf/12 mm | The cell Current efficiency Initial % | The cell electric resistivity Initial $\Omega \cdot cm^2$ | Current efficiency % after 200 cycles | The cell electric resistivity $\Omega \cdot cm^2$ after 200 cycles | Separation membrane wrinkles after cell disintegration |
| Example 1 | 203 | 100,000 or more | 260 | 97.2 | 0.91 | 97.1 | 0.91 | A |
| Example 2 | 219 | 100,000 or more | — | 98 | 0.85 | 97.6 | 0.85 | B |
| Example 3 | 220 | 100,000 or more | — | 97.8 | 0.86 | 97.3 | 0.87 | B |
| Example 4 | 351 | 100,000 or more | — | 97 | 0.9 | 94.8 | 0.98 | B |
| Example 5 | 120 | 100,000 or more | — | 98.1 | 1.02 | 97.2 | 1.02 | B |
| Example 6 | 120 | 100,000 or more | — | 97.6 | 1.02 | 96.5 | 1.05 | C |
| Example 7 | 252 | 100,000 or more | — | 96.8 | 1.05 | 94.1 | 1.15 | C |
| Example 8 | 200 | 100,000 or more | — | 96 | 0.66 | 95.7 | 0.67 | B |
| Example 9 | 332 | 100,000 or more | — | 94.3 | 0.7 | 92 | 0.76 | B |
| Example 10 | 422 | 100,000 or more | — | 97.8 | 1.22 | 94.4 | 1.35 | D |
| Example 11 | 422 | 100,000 or more | — | 97.5 | 1.22 | 94.4 | 1.36 | D |
| Example 12 | 217 | 100,000 or more | — | 97.4 | 0.95 | 96.9 | 0.96 | B |
| Example 13 | 103 | 100,000 or more | 140 | 97.0 | 1.06 | 96.5 | 1.08 | B |
| Example 14 | 117 | 100,000 or more | — | 97.4 | 1.09 | 95.6 | 1.18 | C |
| Example 15 | 300 | 100,000 or more | 150 | 97.0 | 1.20 | 96.2 | 1.21 | B |
| Example 16 | 313 | 100,000 or more | — | 97.4 | 1.24 | 95.8 | 1.28 | C |
| Example 17 | 316 | 100,000 or more | — | 97.9 | 1.13 | 95.8 | 1.17 | C |
| Example 18 | 316 | 100,000 or more | — | 98.1 | 1.14 | 96.3 | 1.17 | C |
| Example 19 | 447 | 100,000 or more | — | 96.3 | 1.18 | 94.4 | 1.29 | C |
| Example 20 | 202 | 100,000 or more | 240 | 96.6 | 0.90 | 96.5 | 0.90 | A |
| Example 21 | 215 | 100,000 or more | — | 97.0 | 0.94 | 96.2 | 0.95 | B |
| Example 22 | 218 | 100,000 or more | — | 97.8 | 0.85 | 97.1 | 0.85 | B |
| Example 23 | 218 | 100,000 or more | — | 98.1 | 0.85 | 97.4 | 0.85 | B |
| Example 24 | 350 | 100,000 or more | — | 97.0 | 0.94 | 96.5 | 0.96 | B |
| Example 25 | 338 | 100,000 or more | 150 | 96.7 | 1.20 | 92.6 | 1.49 | C |
| Example 26 | 352 | 100,000 or more | — | 96.9 | 1.25 | 90.9 | 1.65 | D |
| Example 27 | 355 | 100,000 or more | — | 97.3 | 1.18 | 92.2 | 1.49 | D |
| Example 28 | 355 | 100,000 or more | — | 97.3 | 1.17 | 92.7 | 1.36 | D |
| Example 29 | 486 | 100,000 or more | — | 95.9 | 1.27 | 87.7 | 1.53 | D |

TABLE 2-continued

| | | | | | | | | |
|---|---|---|---|---|---|---|---|---|
| Example 30 | 308 | 100,000 or more | 120 | 96.7 | 1.29 | 92.2 | 1.39 | C |
| Example 31 | 322 | 100,000 or more | — | 97.0 | 1.33 | 89.2 | 1.54 | D |
| Example 32 | 325 | 100,000 or more | — | 97.4 | 1.24 | 90.6 | 1.47 | D |
| Example 33 | 325 | 100,000 or more | — | 97.6 | 1.24 | 92.5 | 1.39 | D |
| Example 34 | 457 | 100,000 or more | — | 96.5 | 1.38 | 87.0 | 1.88 | D |
| Example 35 | 120 | 100,000 or more | — | 98.0 | 0.65 | 97.6 | 0.65 | A |
| Example 36 | 220 | 100,000 or more | — | 97.8 | 0.83 | 97.4 | 0.84 | A |
| Comparative Example 1 | 104 | 100,000 or more | 50 | 97 | 1.4 | 92.8 | 1.59 | D |
| Comparative Example 2 | 120 | 100,000 or more | — | 97.8 | 1.44 | 91.4 | 1.65 | E |
| Comparative Example 3 | 121 | 100,000 or more | — | 97 | 1.47 | 91 | 1.65 | E |
| Comparative Example 4 | 252 | 100,000 or more | — | 96.7 | 1.8 | 88.1 | 1.72 | E |
| Comparative Example 5 | 183 | 100,000 or more | 10 | 96.4 | 2 | 92.8 | 2.3 | D |
| Comparative Example 6 | 201 | 100,000 or more | — | 97.1 | 2.08 | 91.9 | 2.51 | E |
| Comparative Example 7 | 200 | 100,000 or more | — | 96.9 | 2.08 | 90.8 | 2.65 | E |
| Comparative Example 8 | 333 | 100,000 or more | — | 94.1 | 2.08 | 86.8 | 2.73 | E |
| Comparative Example 9 | 202 | 2600 | — | 80 | 0.55 | 78 | 0.58 | A |
| Comparative Example 10 | 117 | 100,000 or more | — | 97.2 | 1.48 | 92.2 | 1.69 | E |

The present application is based on a Japanese patent application (Japanese Patent Application No. 2012-249748) filed on Nov. 13, 2012; the disclosure of which is hereby incorporated by reference.

INDUSTRIAL APPLICABILITY

The separation membrane of the present invention has industrial applicability as a separation membrane for redox flow secondary battery having excellent ion permselectivity, low electrical resistance, excellent durability (mainly, resistance to oxidation by hydroxy radical), and further, excellent dimensional stability in an electrolytic solution.

REFERENCE SIGNS LIST

1 Positive electrode
2 Positive electrode cell
3 Negative electrode
4 Negative electrode cell
5 Separation membrane
5 Electrolytic cell
7 Positive electrode electrolytic solution tank
8 Negative electrode electrolytic solution tank
9 AC-DC converter

The invention claimed is:

1. A redox flow secondary battery comprising an electrolytic cell, the electrolytic cell comprising:
a positive electrode cell,
a negative electrode cell, and
a separation membrane that separates the positive electrode cell and the negative electrode cell,
wherein:
the separation membrane comprises a microporous membrane and an ion-exchange resin layer contacting the microporous membrane, and an air resistance of the separation membrane per thickness of 200 µm is 50000 sec/100 cc or more,
the microporous membrane comprises a polyolefin resin or a vinylidene fluoride resin and an inorganic filler, and
a smoothness of at least a surface of the microporous membrane contacting the ion-exchange resin layer is 16000 seconds or less.

2. The redox flow secondary battery according to claim 1, wherein a tensile modulus of the microporous membrane is 200 N/cm or less.

3. The redox flow secondary battery according to claim 2, wherein the redox flow secondary battery is a vanadium redox flow secondary battery, in which an electrolytic solution comprising vanadium is used as a positive electrolytic solution and a negative electrolytic solution.

4. The redox flow secondary battery according to claim 2, wherein the ion-exchange resin layer comprises an ion-exchange resin composition comprising, as a main component, a fluorine-based polyelectrolyte polymer having a structure represented by the following formula (1):

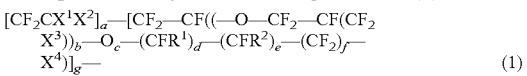
(1)

wherein:
$X^1$, $X^2$ and $X^3$ each independently represent one or more selected from the group consisting of a halogen atom and a perfluoroalkyl group having 1 to 3 carbon atoms;
$X^4$ represents $COOZ$, $SO_3Z$, $PO_3Z_2$ or $PO_3HZ$;
Z represents a hydrogen atom, an alkaline metal atom, an alkaline-earth metal atom, or an amine selected from the group consisting of $NH_4$, $NH_3R_1$, $NH_2R_1R_2$, $NHR_1R_2R_3$ and $NR_1R_2R_3R_4$, wherein $R_1$, $R_2$, $R_3$ and $R_4$ each independently represent any one or more selected from the group consisting of an alkyl group and an arene group, and when $X^4$ is $PO_3Z_2$, Z may be identical to or different from one another;

$R^1$ and $R^2$ each independently represent one or more selected from the group consisting of a halogen atom, a perfluoroalkyl group and a fluorochloroalkyl group having 1 to 10 carbon atoms;

a and g each represent a number satisfying $0 \leq a < 1$, $0 < g \leq 1$, and a+g=1;

b represents an integer of 0 to 8;

c represents 0 or 1; and d, e and f each independently represent an integer of 0 to 6 provided that d, e and f do not simultaneously represent 0.

5. The redox flow secondary battery according to claim 2, wherein the ion-exchange resin layer comprises, as a fluorine-based polyelectrolyte polymer, a perfluorocarbon sulfonic acid resin (PFSA resin) having a structure represented by the following formula (2):

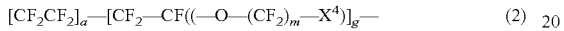

$$[CF_2CF_2]_a\text{—}[CF_2\text{—}CF((\text{—}O\text{—}(CF_2)_m\text{—}X^4)]_g\text{—} \qquad (2)$$

wherein:

a and g each represent a number satisfying $0 \leq a < 1$, $0 < g \leq 1$, and a+g=1;

m represents an integer of 1 to 6; and $X^4$ represents $SO_3H$.

6. The redox flow secondary battery according to claim 2, wherein:

the ion-exchange resin layer comprises a fluorine-based polyelectrolyte polymer having an equivalent weight EW (dry mass grams per equivalent of ion exchange groups) of 300 to 1300 g/eq, and an equilibrium water content of the ion-exchange resin layer is 5% to 80% by mass.

7. A separation membrane for redox flow secondary battery, comprising:

a microporous membrane comprising a polyolefin resin or a vinylidene fluoride resin and an inorganic filler; and an ion-exchange resin layer contacting the microporous membrane, wherein:

an air resistance of the separation membrane per thickness of 200 μm is 50000 sec/100 cc or more, and a smoothness of at least a surface of the microporous membrane contacting the ion-exchange resin layer is 16000 seconds or less.

8. The separation membrane for redox flow secondary battery according to claim 7, wherein a tensile modulus of the microporous membrane is 200 N/cm or less.

9. The separation membrane for redox flow secondary battery according to claim 8, wherein the ion-exchange resin layer comprises an ion-exchange resin composition comprising, as a main component, a fluorine-based polyelectrolyte polymer having a structure represented by the following formula (1):

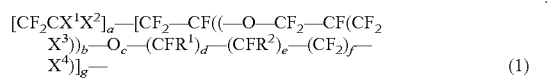

$$[CF_2CX^1X^2]_a\text{—}[CF_2\text{—}CF((\text{—}O\text{—}CF_2\text{—}CF(CF_2X^3))_b\text{—}O_c\text{—}(CFR^1)_d\text{—}(CFR^2)_e\text{—}(CF_2)_f\text{—}X^4)]_g\text{—} \qquad (1)$$

wherein:

$X^1$, $X^2$ and $X^3$ each independently represent one or more selected from the group consisting of a halogen atom and a perfluoroalkyl group having 1 to 3 carbon atoms;

$X^4$ represents COOZ, $SO_3Z$, $PO_3Z_2$ or $PO_3HZ$;

Z represents a hydrogen atom, an alkaline metal atom, an alkaline-earth metal atom, or an amine selected from the group of consisting of $NH_4$, $NH_3R_1$, $NH_2R_1R_2$, $NHR_1R_2R_3$ and $NR_1R_2R_3R_4$, wherein $R_1$, $R_2$, $R_3$ and $R_4$ each independently represent any one or more selected from the group consisting of an alkyl group and an arene group, and when $X^4$ is $PO_3Z_2$, Z may be identical to or different from one another;

$R^1$ and $R^2$ each independently represent one or more selected from the group consisting of a halogen atom, a perfluoroalkyl group and a fluorochloroalkyl group having 1 to 10 carbon atoms;

a and g each represent a number satisfying $0 \leq a < 1$, $0 < g \leq 1$, and a+g=1;

b represents an integer of 0 to 8;

c represents 0 or 1; and d, e and f each independently represent an integer of 0 to 6, provided that d, e and f do not simultaneously represent 0.

10. The separation membrane for redox flow secondary battery according to claim 8, wherein the ion-exchange resin layer comprises, as a fluorine-based polyelectrolyte polymer, a perfluorocarbon sulfonic acid resin (PFSA resin) having a structure represented by the following formula (2):

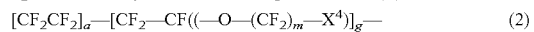

$$[CF_2CF_2]_a\text{—}[CF_2\text{—}CF((\text{—}O\text{—}(CF_2)_m\text{—}X^4)]_g\text{—} \qquad (2)$$

wherein:

a and g each represent a number satisfying $0 \leq a < 1$, $0 < g \leq 1$, and a+g=1;

m represents an integer of 1 to 6; and $X^4$ represents $SO_3H$.

11. The separation membrane for redox flow secondary battery according to claim 8, wherein:

the ion-exchange resin layer comprises a fluorine-based polyelectrolyte polymer having an equivalent weight EW (dry mass grams per equivalent of ion exchange groups) of 300 to 1300 g/eq, and an equilibrium water content of the ion-exchange resin layer is 5% to 80% by mass.

12. The redox flow secondary battery according to claim 1, wherein the redox flow secondary battery is a vanadium redox flow secondary battery, in which an electrolytic solution comprising vanadium is used as a positive electrolytic solution and a negative electrolytic solution.

13. The redox flow secondary battery according to claim 1, wherein the ion-exchange resin layer comprises an ion-exchange resin composition comprising, as a main component, a fluorine-based polyelectrolyte polymer having a structure represented by the following formula (1):

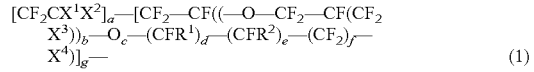

$$[CF_2CX^1X^2]_a\text{—}[CF_2\text{—}CF((\text{—}O\text{—}CF_2\text{—}CF(CF_2X^3))_b\text{—}O_c\text{—}(CFR^1)_d\text{—}(CFR^2)_e\text{—}(CF_2)_f\text{—}X^4)]_g\text{—} \qquad (1)$$

$X^1$, $X^2$ and $X^3$ each independently represent one or more selected from the group consisting of a halogen atom and a perfluoroalkyl group having 1 to 3 carbon atoms;

$X^4$ represents COOZ, $SO_3Z$, $PO_3Z_2$ or $PO_3HZ$;

Z represents a hydrogen atom, an alkaline metal atom, an alkaline-earth metal atom, or an amine selected from the group consisting of $NH_4$, $NH_3R_1$, $NH_2R_1R_2$, $NHR_1R_2R_3$ and $NR_1R_2R_3R_4$, wherein $R_1$, $R_2$, $R_3$ and $R_4$ each independently represent any one or more selected from the group consisting of an alkyl group and an arene group, and when $X^4$ is $PO_3Z_2$, Z may be identical to or different from one another;

$R^1$ and $R^2$ each independently represent one or more selected from the group consisting of a halogen atom, a perfluoroalkyl group and a fluorochloroalkyl group having 1 to 10 carbon atoms;

a and g each represent a number satisfying $0 \leq a < 1$, $0 < g \leq 1$, and a+g=1;

b represents an integer of 0 to 8;

c represents 0 or 1; and d, e and f each independently represent an integer of 0 to 6, provided that d, e and f do not simultaneously represent 0.

14. The redox flow secondary battery according to claim 1, wherein the ion-exchange resin layer comprises, as a fluorine-based polyelectrolyte polymer, a perfluorocarbon sulfonic acid resin (PFSA resin) having a structure represented by the following formula (2):

$$[CF_2CF_2]_a\text{—}[CF_2\text{—}CF((\text{—}O\text{—}(CF_2)_m\text{—}X^4)]_g\text{—} \quad (2)$$

wherein:

a and g each represent a number satisfying $0 \leq a < 1$, $0 < g \leq 1$, and $a+g=1$;

m represents an integer of 1 to 6; and $X^4$ represents $SO_3H$.

15. The redox flow secondary battery according to claim 1, wherein:

the ion-exchange resin layer comprises a fluorine-based polyelectrolyte polymer having an equivalent weight EW (dry mass grams per equivalent of ion exchange groups) of 300 to 1300 g/eq, and an equilibrium water content of the ion-exchange resin layer is 5% to 80% by mass.

16. The separation membrane for redox flow secondary battery according to claim 7, wherein the ion-exchange resin layer comprises an ion-exchange resin composition comprising, as a main component, a fluorine-based polyelectrolyte polymer having a structure represented by the following formula (1):

$$[CF_2CX^1X^2]_a\text{—}[CF_2\text{—}CF((\text{—}O\text{—}CF_2\text{—}CF(CF_2X^3))_b\text{—}O_c\text{—}(CFR^1)_d\text{—}(CFR^2)_e\text{—}(CF_2)_f\text{—}X^4)]_g\text{—} \quad (1)$$

wherein:

$X^1$, $X^2$ and $X^3$ each independently represent one or more selected from the group consisting of a halogen atom and a perfluoroalkyl group having 1 to 3 carbon atoms;

$X^4$ represents COOZ, $SO_3Z$, $PO_3Z_2$ or $PO_3HZ$;

Z represents a hydrogen atom, an alkaline metal atom, an alkaline-earth metal atom, or an amine selected from the group consisting of $NH_4$, $NH_3R_1$, $NH_2R_1R_2$, $NHR_1R_2R_3$ and $NR_1R_2R_3R_4$, wherein $R_1$, $R_2$, $R_3$ and $R_4$ each independently represent any one or more selected from the group consisting of an alkyl group and an arene group, and when $X^4$ is $PO_3Z_2$, Z may be identical to or different from one another;

$R^1$ and $R^2$ each independently represent one or more selected from the group consisting of a halogen atom, a perfluoroalkyl group and a fluorochloroalkyl group having 1 to 10 carbon atoms;

a and g each represent a number satisfying $0 \leq a < 1$, $0 < g \leq 1$, and $a+g=1$;

b represents an integer of 0 to 8;

c represents 0 or 1; and d, e and f each independently represent an integer of 0 to 6, provided that d, e and f do not simultaneously represent 0.

17. The separation membrane for redox flow secondary battery according to claim 7, wherein the ion-exchange resin layer comprises, as a fluorine-based polyelectrolyte polymer, a perfluorocarbon sulfonic acid resin (PFSA resin) having a structure represented by the following formula (2):

$$[CF_2CF_2]_a\text{—}[CF_2\text{—}CF((\text{—}O\text{—}(CF_2)_m\text{—}X^4)]_g\text{—} \quad (2)$$

wherein:

a and g each represent a number satisfying $0 \leq a < 1$, $0 < g \leq 1$, and $a+g=1$;

m represents an integer of 1 to 6; and $X^4$ represents $SO_3H$.

18. The separation membrane for redox flow secondary battery according to claim 7, wherein:

the ion-exchange resin layer comprises a fluorine-based polyelectrolyte polymer having an equivalent weight EW (dry mass grams per equivalent of ion exchange groups) of 300 to 1300 g/eq, and an equilibrium water content of the ion-exchange resin layer is 5% to 80% by mass.

* * * * *